(12) United States Patent
Okubo et al.

(10) Patent No.: US 9,856,811 B2
(45) Date of Patent: Jan. 2, 2018

(54) INTERNAL COMBUSTION ENGINE

(71) Applicant: TOYOTA JIDOSHA KABUSHIKI KAISHA, Toyota-shi, Aichi-ken (JP)

(72) Inventors: Takuya Okubo, Susono (JP); Norihisa Nakagawa, Susono (JP); Koichi Kimura, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 11 days.

(21) Appl. No.: 15/166,618

(22) Filed: May 27, 2016

(65) Prior Publication Data

US 2016/0348601 A1 Dec. 1, 2016

(30) Foreign Application Priority Data

Jun. 1, 2015 (JP) ................................. 2015-111495

(51) Int. Cl.
*F02D 41/14* (2006.01)
*F01N 11/00* (2006.01)
(Continued)

(52) U.S. Cl.
CPC ........ *F02D 41/1454* (2013.01); *F01N 11/007* (2013.01); *F02B 25/145* (2013.01);
(Continued)

(58) Field of Classification Search
CPC ............. F02D 41/1454; F02D 41/1441; F02D 13/0261; F02D 41/006; F02D 41/1456;
(Continued)

(56) References Cited

U.S. PATENT DOCUMENTS

| | | | | |
|---|---|---|---|---|
| 4,996,966 A | * | 3/1991 | Hitomi | F01L 1/34403 123/559.3 |
| 5,421,296 A | * | 6/1995 | Hitomi | F01L 1/34403 123/184.31 |
| 5,427,078 A | * | 6/1995 | Hitomi | F02B 27/02 123/184.53 |
| 8,061,136 B2 | * | 11/2011 | Delp | F02D 13/0261 123/345 |

(Continued)

FOREIGN PATENT DOCUMENTS

JP 2006194096 A * 7/2006 ......... F02D 41/3035
JP 2006-322335 A 11/2006
(Continued)

*Primary Examiner* — Joseph Dallo
(74) *Attorney, Agent, or Firm* — Andrews Kurth Kenyon LLP

(57) ABSTRACT

The internal combustion engine comprises a supercharger, a variable valve timing mechanism able to change a valve overlap amount, a catalyst arranged in an exhaust passage and able to store oxygen, a downstream side air-fuel ratio sensor arranged at a downstream side of the catalyst in an exhaust flow direction and able to detect an air-fuel ratio of outflowing exhaust gas flowing out from the catalyst, and a scavenging control device able to control a scavenging amount by controlling the valve overlap amount by the variable valve timing mechanism. The scavenging control device reduces the valve overlap amount when an air-fuel ratio detected by the downstream side air-fuel ratio sensor changes from less than a lean judged air-fuel ratio leaner than a stoichiometric air-fuel ratio to the lean judged air-fuel ratio or more during scavenging.

9 Claims, 9 Drawing Sheets

(51) Int. Cl.
*F02B 25/14* (2006.01)
*F02B 33/40* (2006.01)
*F02B 37/12* (2006.01)
*F02D 13/02* (2006.01)
*F01N 3/10* (2006.01)
*F01N 13/00* (2010.01)
*F02D 41/00* (2006.01)

(52) U.S. Cl.
CPC .............. *F02B 33/40* (2013.01); *F02B 37/12* (2013.01); *F02D 13/0261* (2013.01); *F02D 41/1441* (2013.01); *F01N 3/101* (2013.01); *F01N 13/0093* (2014.06); *F01N 2550/02* (2013.01); *F02D 41/006* (2013.01); *F02D 41/1456* (2013.01); *F02D 2041/001* (2013.01); *Y02T 10/18* (2013.01); *Y02T 10/22* (2013.01)

(58) Field of Classification Search
CPC .. F02D 2041/001; F02B 33/40; F02B 25/145; F02B 37/12; F01N 11/007; F01N 13/0093; F01N 3/101; Y02T 10/22; Y02T 10/18
See application file for complete search history.

(56) References Cited

U.S. PATENT DOCUMENTS

| | | | |
|---|---|---|---|
| 2007/0240679 A1* | 10/2007 | Tabata | F02B 29/083 123/348 |
| 2009/0070014 A1 | 3/2009 | Miyashita | |
| 2010/0263638 A1* | 10/2010 | Kogo | F02B 37/004 123/562 |
| 2015/0211961 A1* | 7/2015 | Ueno | F02D 13/0261 73/114.22 |
| 2015/0275782 A1* | 10/2015 | Moriguchi | F02D 41/18 60/605.1 |
| 2016/0061084 A1 | 3/2016 | Okazaki et al. | |

FOREIGN PATENT DOCUMENTS

| | | | | |
|---|---|---|---|---|
| JP | 2009068450 A | * | 4/2009 | |
| JP | 2012067678 A | * | 4/2012 | |
| JP | 2012163039 A | * | 8/2012 | ............ F02P 5/1516 |
| JP | 2013185536 A | * | 9/2013 | |
| JP | 2014-025355 A | | 2/2014 | |
| JP | 2015014202 A | * | 1/2015 | |
| WO | 2014/118892 A1 | | 8/2014 | |

* cited by examiner

INTERNAL COMBUSTION ENGINE

CROSS-REFERENCE TO RELATED APPLICATION

The present application claims priority to Japanese Patent Application No. 2015-111495 filed on Jun. 1, 2015, which is incorporated herein by reference in its entirety.

TECHNICAL FIELD

The present invention relates to an internal combustion engine.

BACKGROUND ART

In an internal combustion engine, if valve overlap occurs when the pressure inside an intake port is higher than the pressure inside an exhaust port, air is blown from the intake passage through the cylinder to the exhaust passage in what is known as "scavenging". In an internal combustion engine provided with a supercharger such as a turbocharger, scavenging is intentionally caused if the amount of intake air is insufficient for the requested torque. By causing scavenging, the amount of exhaust gas increases and the speed of the turbine of the supercharger is raised. As a result, the pressure of the intake air is raised and the amount of intake air is increased.

Known in the past has been an internal combustion engine configured to provide an air-fuel ratio sensor in an exhaust passage of the internal combustion engine and control the amount of fuel fed to a combustion chamber of the internal combustion engine so that the output of this air-fuel ratio sensor matches a target air-fuel ratio (for example stoichiometric air-fuel ratio (14.6)) (for example, PLT 1). In such control, during scavenging, the amount of fuel fed to a combustion chamber is controlled so that the average air-fuel ratio of the exhaust gas including the air blown from the intake passage through the cylinder to the exhaust passage becomes the target air-fuel ratio.

CITATIONS LIST

Patent Literature

PLT 1: International Publication No. 2014/118892
PLT 2: Japanese Patent Publication No. 2006-322335A
PLT 3: Japanese Patent Publication No. 2014-25355A

SUMMARY OF INVENTION

Technical Problem

However, if scavenging occurs, the air inside the cylinder decreases due to the blown air, so the combustion air-fuel ratio in the cylinder becomes rich. If the scavenging amount is large and the rich degree of the combustion air-fuel ratio becomes higher, the concentration of hydrogen in the exhaust gas becomes higher. Hydrogen is faster in speed of diffusion compared with other components in the exhaust gas in the diffusion-regulating layer of the air-fuel ratio sensor, so reaches the electrode surface of the air-fuel ratio sensor faster than these other components. As a result, the electrode surface of the air-fuel ratio sensor becomes a rich atmosphere and the output of the air-fuel ratio sensor deviates to the rich side. If controlling the air-fuel ratio based on an air-fuel ratio deviated to the rich side, the actual exhaust air-fuel ratio becomes leaner than the target air-fuel ratio. As a result, the efficiency of removal of the unburned gas etc. at the exhaust purification catalyst falls and the exhaust emission is liable to deteriorate.

Further, instead of controlling the amount of fuel fed to the combustion chamber based on the output of the air-fuel ratio sensor by feedback, sometimes the amount of fuel fed to the combustion chamber is controlled so that a ratio of fuel and air fed to the combustion chamber matches a target air-fuel ratio (for example stoichiometric air-fuel ratio (14.6)). However, even if such control were performed, during scavenging, the air blown through to the exhaust passage and the unburned fuel would alternately reach the exhaust purification catalyst. Due to this, the exhaust gas could not be efficiently purified in the exhaust purification catalyst and the exhaust emission would be liable to deteriorate.

Further, the greater the scavenging amount, the higher the possibility of the exhaust emission deteriorating, so it may be considered to set an upper limit of the scavenging amount so as to suppress deterioration of exhaust emission accompanying scavenging. However, an exhaust purification catalyst deteriorates along with the elapse of time. The purification efficiency of an exhaust purification catalyst tends to gradually decrease along with deterioration of the exhaust purification catalyst. For this reason, if setting the upper limit of the scavenging amount considering the purification efficiency of a deteriorated exhaust purification catalyst, the upper limit becomes an extremely small amount. As a result, even in the time period before the exhaust purification catalyst has deteriorated, it is not possible to cause a sufficient amount of scavenging corresponding to the requested torque.

Therefore, in consideration of the above problem, an object of the present invention is to provide an internal combustion engine which can suppress deterioration of the exhaust emission accompanying scavenging without excessively limiting the scavenging amount.

Solution to Problem

In order to solve the above problem, in a first invention, there is provided an internal combustion engine comprising: a supercharger able to change a pressure of air fed to a combustion chamber, a variable valve timing mechanism able to change a valve overlap amount of an intake valve and an exhaust valve, a catalyst arranged in an exhaust passage and able to store oxygen, a downstream side air-fuel ratio sensor arranged at a downstream side of the catalyst in an exhaust flow direction and able to detect an air-fuel ratio of outflowing exhaust gas flowing out from the catalyst, and a scavenging control device able to control a scavenging amount by controlling the valve overlap amount by the variable valve timing mechanism, wherein the scavenging control device reduces the valve overlap amount when an air-fuel ratio detected by the downstream side air-fuel ratio sensor changes from less than a lean judged air-fuel ratio leaner than a stoichiometric air-fuel ratio to the lean judged air-fuel ratio or more during scavenging.

In a second invention, the internal combustion engine further comprises an upstream side air-fuel ratio sensor arranged at an upstream side of the catalyst in the exhaust flow direction and able to detect an air-fuel ratio of inflowing exhaust gas flowing into the catalyst, and an air-fuel ratio control device controlling an amount of fuel fed to the combustion chamber by feedback control so that an air-fuel ratio detected by the upstream side air-fuel ratio sensor matches a target air-fuel ratio, in the first invention.

In a third invention, the target air-fuel ratio is alternately set to a rich set air-fuel ratio richer than the stoichiometric air-fuel ratio and a lean set air-fuel ratio leaner than the stoichiometric air-fuel ratio, and the air-fuel ratio control device switches the target air-fuel ratio to the lean set air-fuel ratio when an air-fuel ratio detected by the downstream side air-fuel ratio sensor becomes a rich judged air-fuel ratio richer than the stoichiometric air-fuel ratio or becomes less in rich control where the target air-fuel ratio is set to the rich set air-fuel ratio, and switches the target air-fuel ratio to the rich set air-fuel ratio when it is estimated that the oxygen storage amount of the catalyst becomes a switching reference storage amount smaller than a maximum storable oxygen amount or becomes more in lean control where the target air-fuel ratio is set to the lean set air-fuel ratio, in the second invention.

In a fourth invention, the scavenging control device controls the valve overlap amount so that the scavenging amount becomes an upper limit or less, decreases the upper limit when an air-fuel ratio of the lean judged air-fuel ratio or more is detected by the downstream side air-fuel ratio sensor during scavenging, and maintains or increases the upper limit when an air-fuel ratio of the lean judged air-fuel ratio or more has not been detected by the downstream side air-fuel ratio sensor during scavenging, in any one of the first to third inventions.

In a fifth invention, the scavenging control device increases the upper limit when an air-fuel ratio of the lean judged air-fuel ratio or more has not been detected by the downstream side air-fuel ratio sensor regardless of having controlled the valve overlap amount so that the scavenging amount becomes the upper limit, in the fourth invention.

Advantageous Effects of Invention

According to the present invention, there is provided an internal combustion engine which can suppress deterioration of the exhaust emission accompanying scavenging without excessively limiting the scavenging amount.

DESCRIPTION OF EMBODIMENTS

Figure 1:
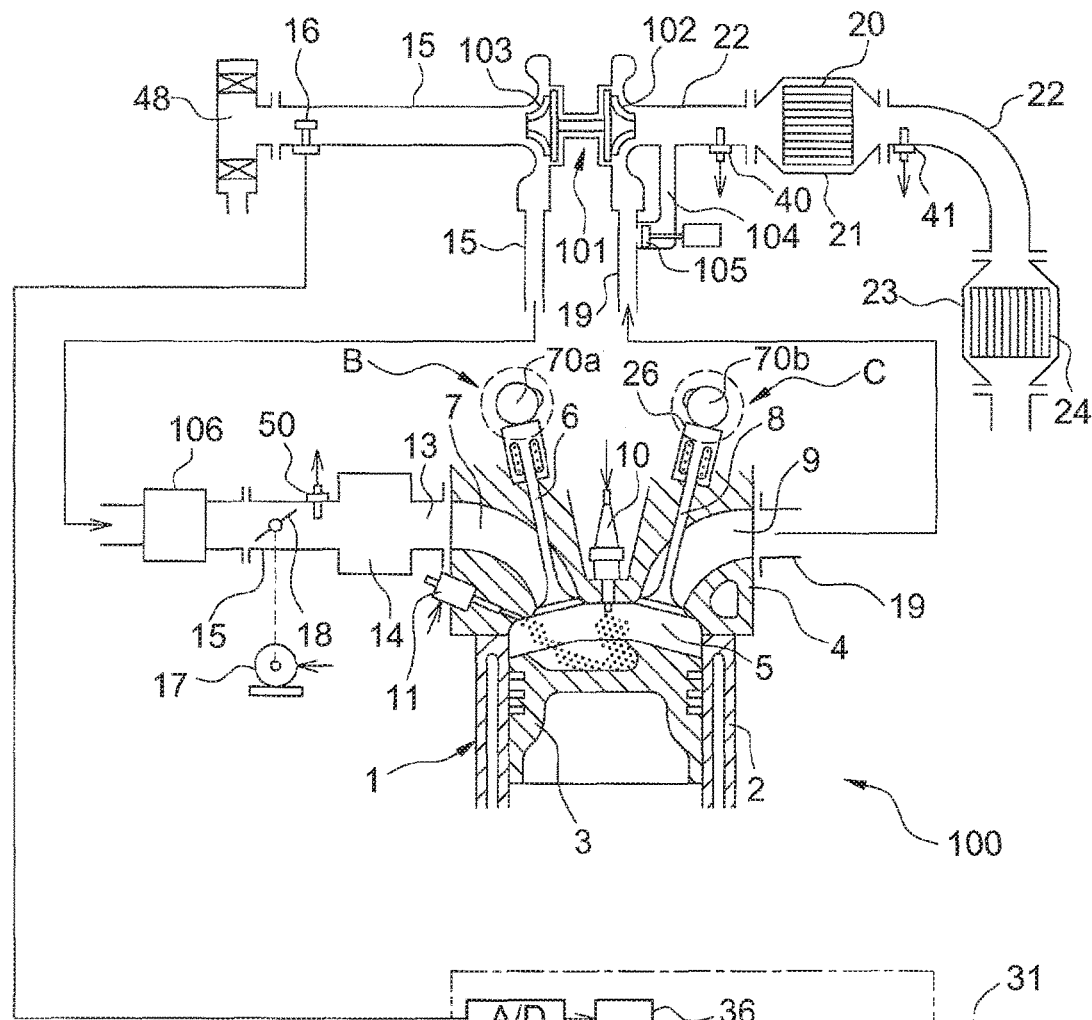
FIG. 1 is a schematic view of an internal combustion engine in an embodiment of the present invention.
Figure 1:
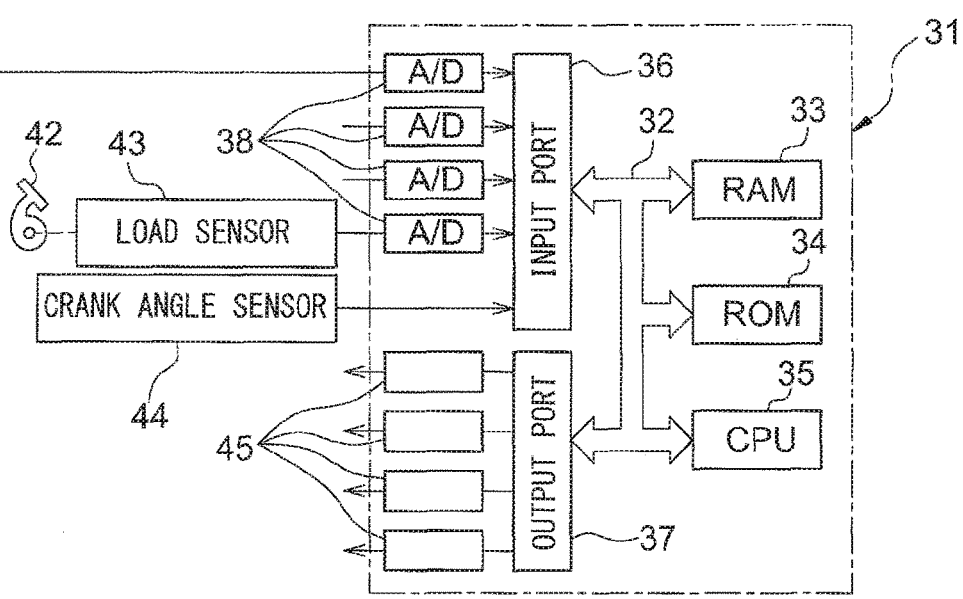

Below, referring to the drawings, embodiments of the present invention will be explained in detail. Note that, in the following explanation, similar component elements are assigned the same reference notations.

<Explanation of Internal Combustion Engine as a Whole>

FIG. 1 is a schematic view of an internal combustion engine 100 in an embodiment of the present invention. The internal combustion engine 100 is provided with an engine body 1 which contains a cylinder block 2 and a cylinder head 4. At the inside of the cylinder block 2, pistons 3 which reciprocate at the inside of the cylinder block 2 are arranged. The internal combustion engine 100 has a plurality of cylinders.

A combustion chamber 5 is formed for each cylinder between the piston 3 and the cylinder head 4. The cylinder head 4 is formed with intake ports 7 and exhaust ports 9. The intake ports 7 and exhaust ports 9 are connected to the combustion chambers 5. An intake valve 6 is arranged at an end part of each intake port 7 and is formed to be able to open and close the intake port 7. An exhaust valve 8 is arranged at an end part of each exhaust port 9 and is formed to be able to open and close the exhaust port 9. Further, the internal combustion engine 100 is provided with a variable valve timing mechanism B which can control the opening timing and the closing timing of each intake valve 6 and a variable valve timing mechanism C which can control the opening timing and the closing timing of each exhaust valve 8.

The internal combustion engine 100 is comprised of fuel injectors 11 for feeding fuel to the combustion chambers 5 and spark plugs 10 for igniting the air-fuel mixture at the combustion chambers 5. The spark plugs 10 are fastened to the cylinder head 4. The fuel injectors 11 are arranged at the circumferential parts of the inner wall surfaces in the cylinder head 4 so as to directly inject fuel into the combustion chambers 5. That is, the internal combustion engine 100 is a cylinder injection type of internal combustion engine. Further, the internal combustion engine 100 uses fuel constituted by gasoline which has a stoichiometric air-fuel ratio of 14.6. However, in the internal combustion engine 100, other fuel may also be used.

The internal combustion engine 100 is provided with a supercharger constituted by a turbocharger 101. The turbocharger 101 includes a turbine 102 which is arranged in the exhaust passage, a compressor 103 which is arranged in the intake passage, and a shaft which connects the turbine 102 and the compressor 103. If the flow of exhaust causes the turbine 102 to turn, the compressor 103 also turns and raises the pressure of the intake air. Therefore, the turbocharger 101 uses the energy of the exhaust gas to compress the intake air to increase the intake air amount.

The intake port 7 of each cylinder is connected through a corresponding intake runner 13 to a surge tank 14. The surge tank 14 is connected through an intake pipe 15 to an outlet part of the compressor 103 of the turbocharger 101. At the inside of the intake pipe 15 which connects the surge tank 14 and compressor 103, a throttle valve 18 which is driven by a throttle valve drive actuator 17 is arranged. The throttle valve 18 can change the opening area of the intake passage by being turned by the throttle valve drive actuator 17. Further, in the intake pipe 15 between the compressor 103 and throttle valve 18, a cooler (intercooler) 106 which cools the intake air which is compressed by the turbocharger 101 is arranged.

An inlet part of the compressor 103 is connected through the intake pipe 15 to an air cleaner 48. At the inside of the intake pipe 15 between the air cleaner 48 and compressor 103, an air flowmeter 16 which detects the amount of intake air is arranged. An intake port 7, intake runner 13, intake pipe 15, etc. define an intake passage which guides air to the combustion chamber 5.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to the inlet part of the turbine 102 of the turbocharger 101. The outlet part of the turbine 102 is connected through an exhaust pipe 22 to an upstream side casing 21. The upstream side casing 21 has an upstream side exhaust purification catalyst 20 built into it. The upstream side casing 21 is connected through the exhaust pipe 22 to a downstream side casing 23. The downstream side casing 23 has a downstream side exhaust purification catalyst 24 built into it. An exhaust port 9, exhaust manifold 19, exhaust pipe 22, etc. define an exhaust passage which discharges the exhaust gas which is produced due to combustion of the air-fuel mixture from a combustion chamber 5.

Further, inside the exhaust pipe 22 between the turbine 102 and the upstream side casing 21, an upstream side air-fuel ratio sensor 40 which detects the air-fuel ratio of the exhaust gas which flows through the inside of the exhaust pipe 22 (that is, the exhaust gas which flows into the upstream side exhaust purification catalyst 20) is arranged. Furthermore, inside the exhaust pipe 22 between the upstream side casing 21 and the downstream side casing 23, a downstream side air-fuel ratio sensor 41 which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24) is arranged.

Between the exhaust manifold 19 upstream of the turbine 102 and the exhaust pipe 22 downstream of the turbine 102, a bypass passage 104 which bypasses the turbine 102 is arranged. At the bypass passage 104, a bypass valve which opens and closes the bypass passage 104 constituted by a wastegate valve 105 is arranged. By adjusting the opening degree of the wastegate valve 105, the amount of exhaust gas which runs through the turbine 102 can be adjusted. Therefore, by controlling the wastegate valve 105, the pressure of the intake air (supercharging pressure) can be controlled. Note that, the supercharging pressure control means which is used to control the supercharging pressure may be any mechanism besides a wastegate valve 105.

The internal combustion engine 100 is provided with a pressure acquiring means for acquiring the supercharging pressure. The pressure acquiring means is for example a supercharging pressure sensor 50. The supercharging pressure sensor 50 is arranged in the intake passage at the downstream side from the throttle valve 18. Note that, the supercharging pressure is estimated from the operating state etc. of the internal combustion engine 100.

The internal combustion engine 100 is provided with an electronic control unit 31 (ECU) which is comprised of a digital computer. The ECU 31 includes components which are connected with each other through bidirectional buses 32, such as a RAM (random access memory) 33, ROM (read only memory) 34, CPU (microprocessor) 35, input port 36, and output port 37.

The output signal of the air flowmeter 16 is input through a corresponding AD converter 38 to the input port 36. The internal combustion engine 100 is provided with an accelerator pedal 42. The accelerator pedal 42 has a load sensor 43 connected to it. The load sensor 43 generates an output voltage which is proportional to the amount of depression of the accelerator pedal 42. The output voltage of the load sensor 43 is input through a corresponding AD converter 38 to the input port 36.

The internal combustion engine 100 is provided with a crank angle sensor 44. The crank angle sensor 44 for example generates an output pulse every time the crankshaft rotates by a predetermined angle. This output pulse is input to the input port 36. In the CPU 35, the engine speed is calculated from the output pulse of this crank angle sensor 44. Further, the output of the crank angle sensor 44 can be used to detect the crank angle. The outputs of the supercharging pressure sensor 50 and air-fuel ratio sensors 40 and 41 are respectively input through corresponding AD converters 38 to the input port 36.

The output port 37 of the ECU 31 is connected through corresponding drive circuits 45 to the spark plugs 10, fuel injectors 11, throttle valve drive actuator 17, wastegate valve 105, and variable valve timing mechanisms B and C. The ECU 31 can control the ignition timings of the spark plugs 10, the fuel injection timings and fuel injection amounts of the fuel injectors 11, the opening degree of the throttle valve 18, the opening degree of the wastegate valve 105, the opening timings and the closing timings of the intake valves 6, and the opening timings and the closing timings of the exhaust valves 8.

<Explanation of Exhaust Purification Catalyst>

The upstream side exhaust purification catalyst 20 and downstream side exhaust purification catalyst 24 have similar configurations. The exhaust purification catalysts 20 and 24 are three-way catalysts which have oxygen storage abilities. Specifically, the exhaust purification catalysts 20 and 24 are comprised of carriers which are comprised of ceramic on which a precious metal which has a catalytic action (for example, platinum (Pt)) and a substance which has an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_X$) when reaching a predetermined activation temperature and, in addition, an oxygen storage ability.

According to the oxygen storage ability of the exhaust purification catalysts 20 and 24, the exhaust purification catalysts 20 and 24 store the oxygen in the exhaust gas when the air-fuel ratio of the exhaust gas which flows into the exhaust purification catalysts 20 and 24 is leaner than the stoichiometric air-fuel ratio (lean air-fuel ratio). On the other hand, the exhaust purification catalysts 20 and 24 release the oxygen which is stored in the exhaust purification catalysts 20 and 24 when the inflowing exhaust gas has an air-fuel ratio which is richer than the stoichiometric air-fuel ratio (rich air-fuel ratio).

Figure 2A:
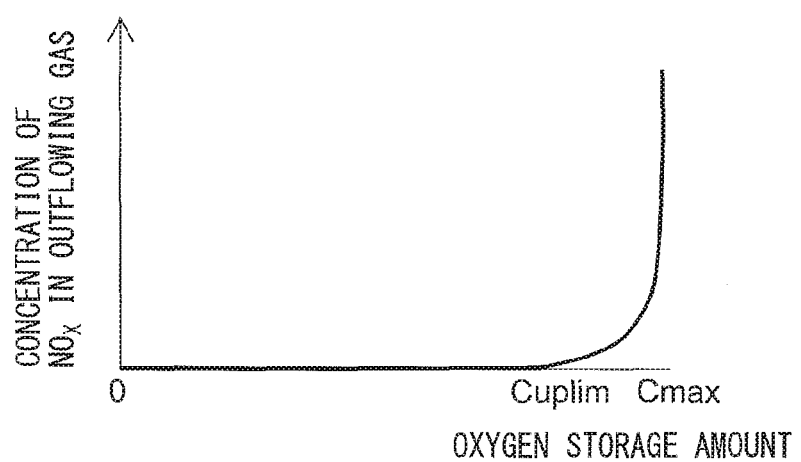
FIG. 2A and FIG. 2B are views showing a relationship between an oxygen storage amount of an exhaust purification catalyst and an $NO_X$ concentration or HC and CO concentration in the exhaust gas flowing out from the exhaust purification catalyst.

The exhaust purification catalysts 20 and 24 have a catalytic action and oxygen storage ability and thereby have the action of removing $NO_X$ and unburned gas according to the stored amount of oxygen. That is, as shown in FIG. 2A, if the air-fuel ratio of the exhaust gas which flows into the exhaust purification catalysts 20 and 24 is a lean air-fuel ratio, when the stored amount of oxygen is small, the exhaust purification catalysts 20 and 24 store the oxygen in the exhaust gas. Further, along with this, the $NO_X$ in the exhaust gas is removed by reduction. Further, if the stored amount of oxygen becomes larger, the exhaust gas which flows out from the exhaust purification catalysts 20 and 24 rapidly rises in concentration of oxygen and $NO_X$ at a certain stored amount near the maximum storable oxygen amount Cmax (in the figure, Cuplim).

Figure 2B:
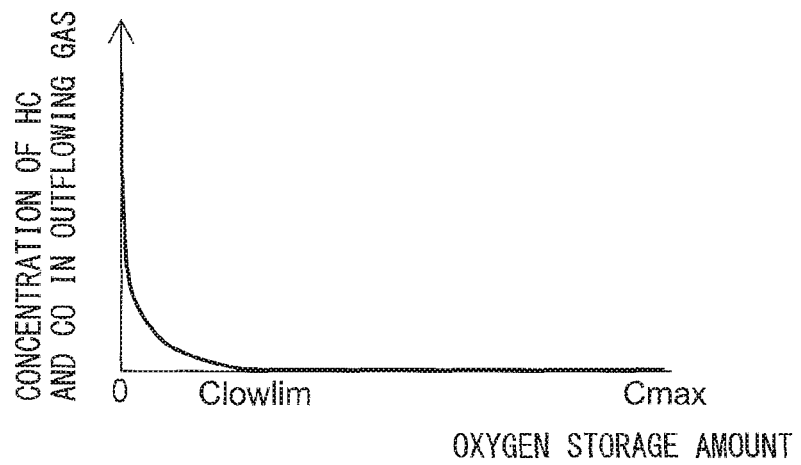

On the other hand, as shown in FIG. 2B, if the air-fuel ratio of the exhaust gas which flows into the exhaust purification catalysts 20 and 24 is the rich air-fuel ratio, when the stored amount of oxygen is large, the oxygen which is stored in the exhaust purification catalysts 20 and 24 is released, and the unburned gas in the exhaust gas is removed by oxidation. Further, if the stored amount of oxygen becomes small, the exhaust gas which flows out from the exhaust purification catalysts 20 and 24 rapidly rises in concentration of unburned gas at a certain stored amount near zero (in the figure, Clowlim).

In the above way, according to the exhaust purification catalysts 20 and 24 which are used in the present embodiment, the characteristics of removal of $NO_X$ and unburned gas in the exhaust gas change depending on the air-fuel ratio of the exhaust gas which flows into the exhaust purification catalysts 20 and 24 and stored amount of oxygen. Note that, if having a catalytic action and oxygen storage ability, the exhaust purification catalysts 20 and 24 may also be catalysts different from the three-way catalyst.

<Configuration of Air-Fuel Ratio Sensor>

Figure 3:
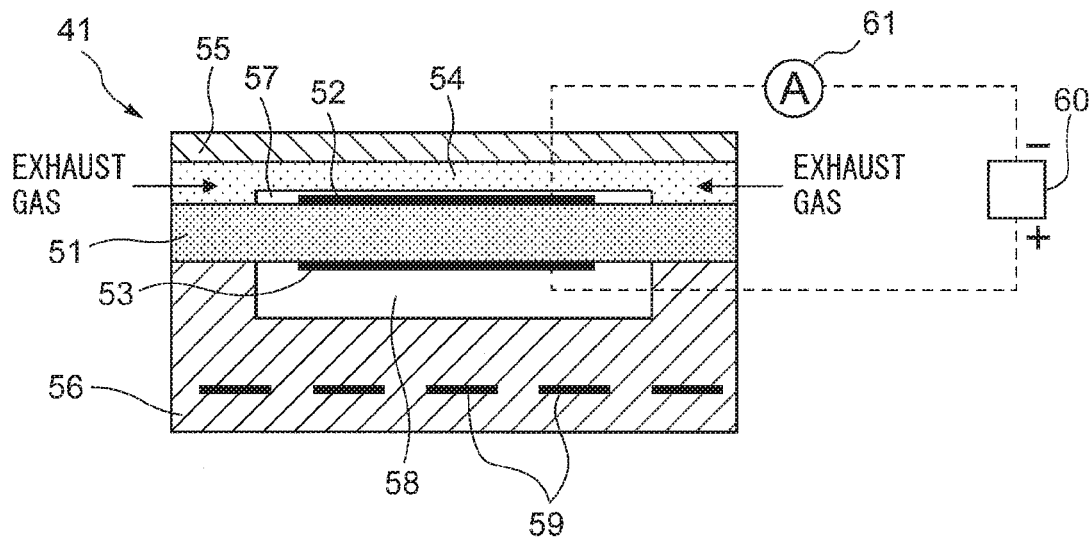
FIG. 3 is a schematic cross-sectional view of an air-fuel ratio sensor.

Next, referring to FIG. 3, the configurations of air-fuel ratio sensors 40 and 41 in the present embodiment will be explained. FIG. 3 is a schematic cross-sectional view of air-fuel ratio sensors 40 and 41. As will be understood from FIG. 3, the air-fuel ratio sensors 40 and 41 in the present embodiment are single-cell type air-fuel ratio sensors each comprised of a solid electrolyte layer and a pair of electrodes forming a single cell.

As shown in FIG. 3, each of the air-fuel ratio sensors 40 and 41 is provided with a solid electrolyte layer 51, an exhaust side electrode (first electrode) 52 which is arranged at one side surface of the solid electrolyte layer 51, an atmosphere side electrode (second electrode) 53 which is arranged at the other side surface of the solid electrolyte layer 51, a diffusion regulation layer 54 which regulates the diffusion of the passing exhaust gas, a protective layer 55 which protects the diffusion regulation layer 54, and a heater part 56 which heats the air-fuel ratio sensor 40 or 41.

On one side surface of the solid electrolyte layer 51, the diffusion regulation layer 54 is provided. On the side surface of the diffusion regulation layer 54 at the opposite side from the side surface of the solid electrolyte layer 51 side, a protective layer 55 is provided. In the present embodiment, a measured gas chamber 57 is formed between the solid electrolyte layer 51 and the diffusion regulation layer 54. In this measured gas chamber 57, the gas to be detected by the air-fuel ratio sensors 40 and 41, that is, the exhaust gas, is introduced through the diffusion regulation layer 54. Further, the exhaust side electrode 52 is arranged inside the measured gas chamber 57, therefore, the exhaust side electrode 52 is exposed to the exhaust gas through the diffusion regulation layer 54. Note that, the measured gas chamber 57 does not necessarily have to be provided. The diffusion regulation layer 54 may directly contact the surface of the exhaust side electrode 52.

On the other side surface of the solid electrolyte layer 51, the heater part 56 is provided. Between the solid electrolyte layer 51 and the heater part 56, a reference gas chamber 58 is formed. Inside this reference gas chamber 58, a reference gas is introduced. In the present embodiment, the reference gas chamber 58 is open to the atmosphere. Therefore, inside the reference gas chamber 58, the atmosphere is introduced as the reference gas. The atmosphere side electrode 53 is arranged inside the reference gas chamber 58, therefore, the atmosphere side electrode 53 is exposed to the reference gas (reference atmosphere).

The heater part 56 is provided with a plurality of heaters 59. These heaters 59 can be used to control the temperature of the air-fuel ratio sensor 40 or 41, in particular, the temperature of the solid electrolyte layers 51. The heater part 56 has a sufficient heat generation capacity for heating the solid electrolyte layer 51 until activating it.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage Vr is supplied by the voltage supply device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage Vr. The current which is detected by this current detection device 61 is the output current of the air-fuel ratio sensors 40 and 41.

Figure 4:
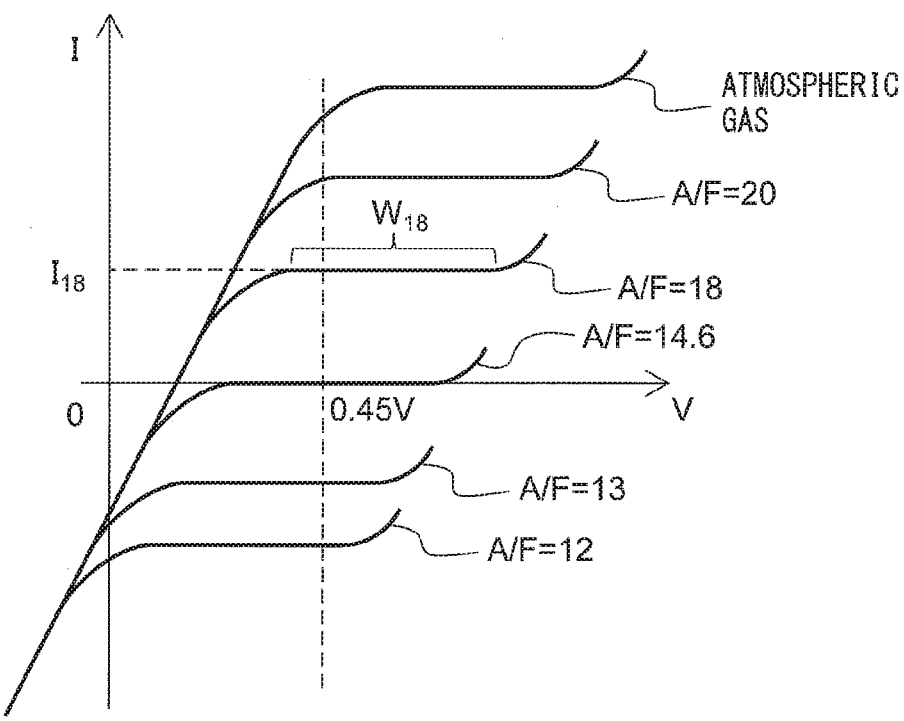
FIG. 4 is a view showing a relationship between a sensor applied voltage and output current at different exhaust air-fuel ratios.

The thus configured air-fuel ratio sensors 40 and 41 have the voltage-current (V-I) characteristic such as shown in FIG. 4. As will be understood from FIG. 4, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 4, the limit current region and limit current when the exhaust air-fuel ratio is 18 are shown by $W_{18}$ and $I_{18}$.

Figure 5:
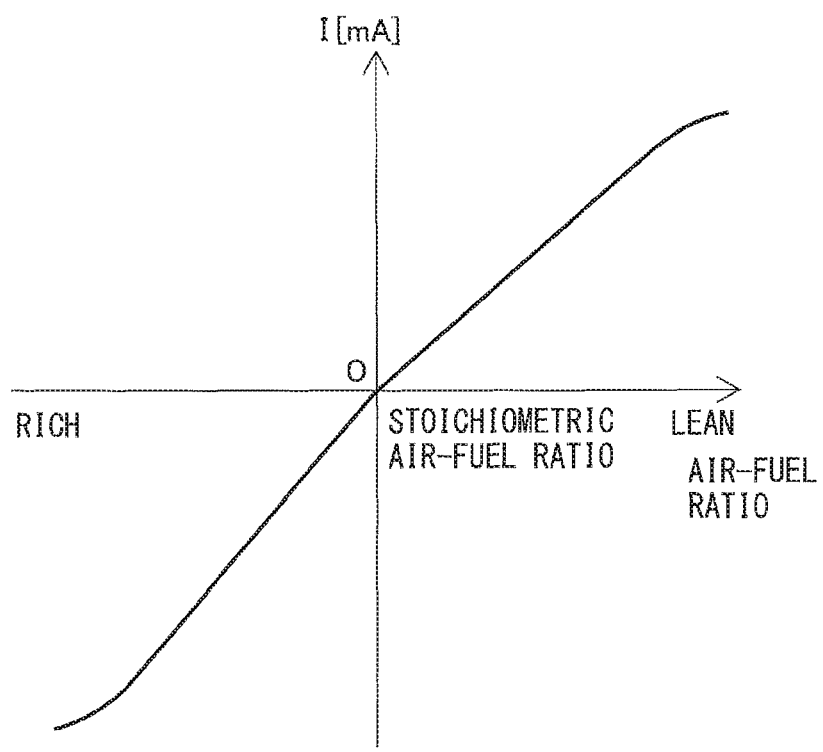
FIG. 5 is a view showing a relationship between an exhaust air-fuel ratio and output current when making a sensor applied voltage constant.

FIG. 5 is a view which shows the relationship between the exhaust air-fuel ratio and the output current I when making the supplied voltage constant at about 0.45V. As will be understood from FIG. 5, in the air-fuel ratio sensors 40 and 41, the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Accordingly, the air-fuel ratio sensors 40 and 41 can continuously (linearly) detect the exhaust air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

In the above example, as the air-fuel ratio sensors 40 and 41, limit current type air-fuel ratio sensors of the structure which is shown in FIG. 3 are used. However, as the air-fuel ratio sensors 40 and 41, for example, it is also possible to use a cup-type limit current type air-fuel ratio sensor or other structure of limit current type air-fuel ratio sensor or air-fuel ratio sensor not a limit current type or any other air-fuel ratio sensor.

<Basic Air Fuel Ratio Control>

Next, an outline of the basic air-fuel ratio control in a control device of an internal combustion engine of the present invention will be explained. The internal combustion engine further comprises an air-fuel ratio control device. The air-fuel ratio control device controls the fuel amount fed to the combustion chamber 5, i.e., the fuel injection amount from the fuel injector 11 by feedback based on the output air-fuel ratio of the upstream side air-fuel ratio sensor 40 so that the output air-fuel ratio of the upstream side air-fuel ratio sensor 40 becomes the target air-fuel ratio. Note that, the "output air-fuel ratio" means the air-fuel ratio which corresponds to the output value of the air-fuel ratio sensor.

On the other hand, in the present embodiment, control for setting the target air-fuel ratio is performed based on the output current of the downstream side air-fuel ratio sensor 41 etc. In the control for setting the target air-fuel ratio, when the output current of the downstream side air-fuel ratio sensor 41 becomes a rich air-fuel ratio, the target air-fuel ratio is made a lean set air-fuel ratio. After this, it is maintained at this air-fuel ratio. In this regard, the "lean set air-fuel ratio" is a predetermined air-fuel ratio which is leaner than the stoichiometric air-fuel ratio (air-fuel ratio serving as center of control) by a certain extent, and, for example, is 14.65 to 20, preferably 14.65 to 18, more preferably 14.65 to 16 or so. Further, the lean set air-fuel ratio can be expressed as an air-fuel ratio of the air-fuel ratio forming the center of control (in the present embodiment, stoichiometric air-fuel ratio) plus a lean correction amount. Further, in the present embodiment, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

If the target air-fuel ratio is changed to the lean set air-fuel ratio, the oxygen excess/deficiency of the exhaust gas which flows into the upstream side exhaust purification catalyst 20 (below, referred to simply as the "inflowing exhaust gas") is cumulatively added. The "oxygen excess/deficiency" means the oxygen which becomes excessive or the oxygen which becomes deficient (amount of excess unburned gas etc.) when trying to make the air-fuel ratio of the inflowing exhaust gas the stoichiometric air-fuel ratio. In particular, when the target air-fuel ratio is the lean set air-fuel ratio, the inflowing exhaust gas becomes excessive in oxygen. This excess oxygen is stored in the upstream side exhaust purification catalyst 20. Therefore, the cumulative value of the oxygen excess/deficiency (below, referred to as the "cumulative oxygen excess/deficiency") can be the to express the estimated value of the stored amount of oxygen of the upstream side exhaust purification catalyst 20.

The oxygen excess/deficiency OED is, for example, calculated by the following formula (1):

$$ODE = 0.23 \times (AFup - AFR) \times Qi \quad (1)$$

where 0.23 indicates the concentration of oxygen in the air, Qi indicates the amount of fuel injection, AFup indicates the output air-fuel ratio of the upstream side air-fuel ratio sensor 40, and AFR indicates the air-fuel ratio forming the center of control (in the present embodiment, stoichiometric air-fuel ratio (14.6)).

If the cumulative oxygen excess/deficiency which was obtained by cumulatively adding the oxygen excess/deficiency which was calculated in this way becomes a predetermined switching reference value (corresponding to a predetermined switching reference storage amount Cref) or more, the target air-fuel ratio which had up to then been the lean set air-fuel ratio is made the rich set air-fuel ratio and after that is maintained at that air-fuel ratio. The rich set air-fuel ratio is a predetermined air-fuel ratio which is richer than the stoichiometric air-fuel ratio (air-fuel ratio forming center of control) by a certain extent. For example, it is made 12 to 14.58, preferably 13 to 14.57, more preferably 14 to 14.55 or so. Further, the rich set air-fuel ratio can be expressed as an air-fuel ratio of the air-fuel ratio forming the center of control (in the present embodiment, stoichiometric air-fuel ratio) minus a rich correction amount. Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or less.

After that, when the output air-fuel ratio of the downstream side air-fuel ratio sensor 41 again becomes a rich judged air-fuel ratio or less, the target air-fuel ratio is again made the lean set air-fuel ratio, then a similar operation is repeated. In this way, in the present embodiment, the target air-fuel ratio of the inflowing exhaust gas is alternately set to the lean set air-fuel ratio and the rich set air-fuel ratio. Specifically, the air-fuel ratio control device switches the target air-fuel ratio to the lean set air-fuel ratio when the air-fuel ratio detected by the downstream side air-fuel ratio sensor 41 becomes a rich judged air-fuel ratio richer than the stoichiometric air-fuel ratio or becomes less in rich control where the target air-fuel ratio is set to the rich set air-fuel ratio and switches the target air-fuel ratio to the rich set air-fuel ratio when it is estimated that the oxygen storage amount of the upstream side exhaust purification catalyst 20 has become a switching reference storage amount smaller than the maximum storable oxygen amount or has become more in lean control where the target air-fuel ratio is set to the lean set air-fuel ratio.

<Explanation of Air-Fuel Ratio Control Using Time Chart>

Figure 6:
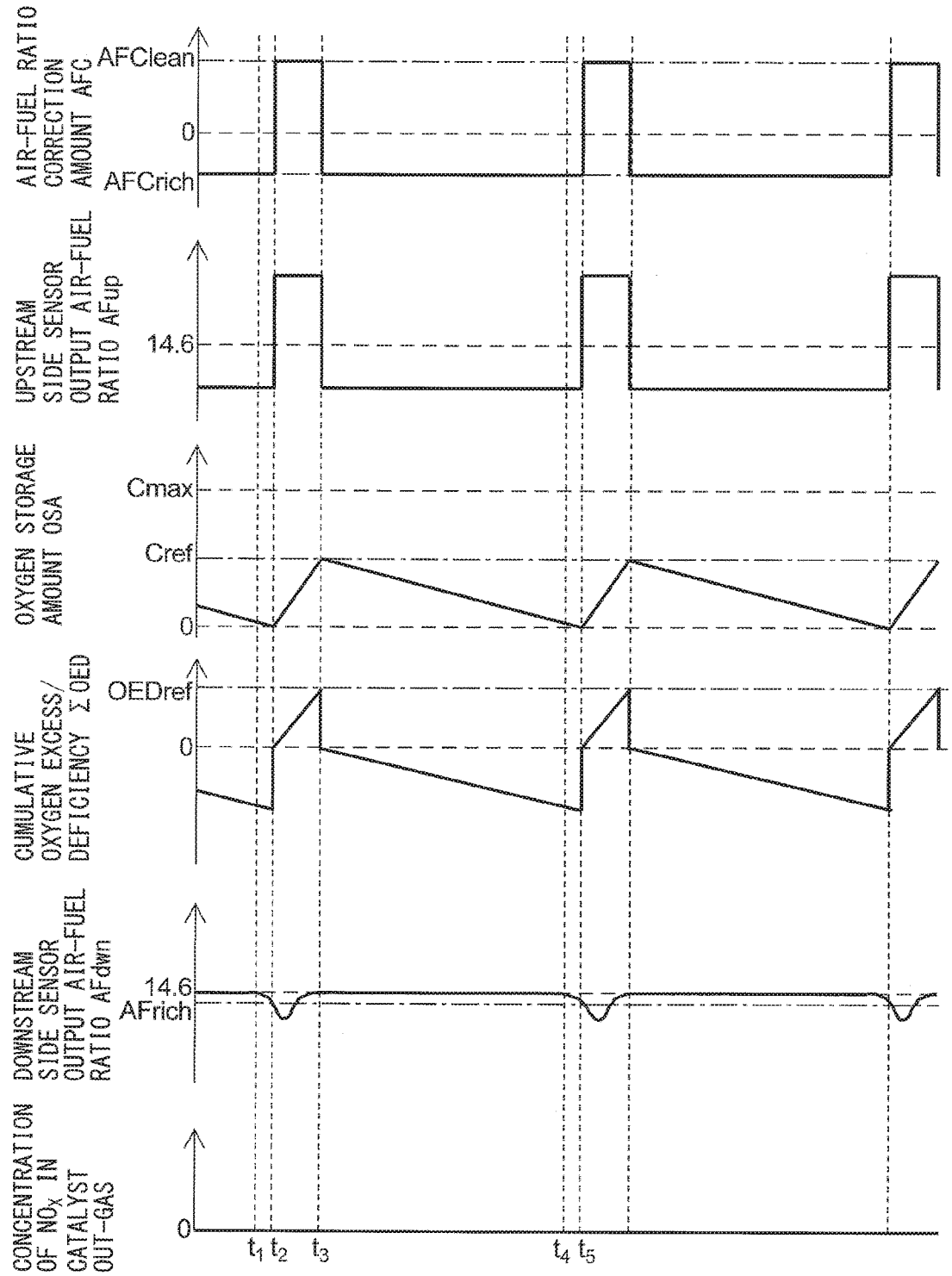
FIG. 6 is a time chart of an air-fuel ratio correction amount relating to a target air-fuel ratio etc.

Referring to FIG. 6, the above-mentioned such operation will be explained in detail. FIG. 6 is a time chart of the air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and concentration of $NO_X$ in the exhaust gas which flows out from the upstream side exhaust purification catalyst 20 (below, referred to simply as the "outflowing exhaust gas") when performing the air-fuel ratio control of the present embodiment.

The cumulative oxygen excess/deficiency ΣOED which is shown in FIG. 6 shows the cumulative value of the oxygen excess/deficiency OED which is calculated by the above formula (1). The cumulative oxygen excess/deficiency ΣOED is reset and made zero when the target air-fuel ratio is switched between the rich set air-fuel ratio TAFrich and the lean set air-fuel ratio TAFlean.

Note that the air-fuel ratio correction amount AFC is a correction amount relating to the target air-fuel ratio of the inflowing exhaust gas. When the air-fuel ratio correction amount AFC is 0, the target air-fuel ratio is set to an air-fuel ratio which is equal to the air-fuel ratio serving as the control center (below, referred to as the "control center air-fuel ratio") (in the present embodiment, the stoichiometric air-fuel ratio). When the air-fuel ratio correction amount AFC is a positive value, the target air-fuel ratio becomes an air-fuel ratio leaner than the control center air-fuel ratio (in the present embodiment, a lean air-fuel ratio), while when the air-fuel ratio correction amount AFC is a negative value, the target air-fuel ratio becomes an air-fuel ratio richer than the control center air-fuel ratio (in the present embodiment, a rich air-fuel ratio). Further, the "control center air-fuel ratio" means the air-fuel ratio to which of the air-fuel ratio correction amount AFC is added in accordance with the engine operating state, that is, the air-fuel ratio which is the reference when changing the target air-fuel ratio in accordance with the air-fuel ratio correction amount AFC.

In the illustrated example, in the state before the time $t_1$, the air-fuel ratio correction amount AFC is made the rich set correction amount AFCrich (corresponding to the rich set air-fuel ratio). That is, the target air-fuel ratio is made the rich air-fuel ratio. Along with this, the output air-fuel ratio of the upstream side air-fuel ratio sensor 40 becomes a rich air-fuel ratio. The unburned gas contained in the inflowing exhaust gas is purified in the upstream side exhaust purification catalyst 20. Further, along with this, oxygen storage amount OSA of the upstream side exhaust purification catalyst 20 is gradually decreased. Accordingly, the cumulative oxygen excess/deficiency ΣOED is also gradually decreased. Further, the unburned gas is not contained in the outflowing exhaust gas due to the purification at the upstream side exhaust purification catalyst 20, so the output air-fuel ratio AFdwn of the downstream side air-fuel ratio sensor 41 becomes substantially the stoichiometric air-fuel ratio. At this time, the air-fuel ratio of the inflowing exhaust gas which becomes the rich air-fuel ratio, so the amount of $NO_X$ which is exhausted from the upstream side exhaust purification catalyst 20 becomes substantially zero.

If the upstream side exhaust purification catalyst 20 gradually decreases in stored amount of oxygen OSA, the stored amount of oxygen OSA approaches zero at the time $t_1$. Along with this, part of the unburned gas which flows into the upstream side exhaust purification catalyst 20 starts to flow out without being purified by the upstream side exhaust purification catalyst 20. Due to this, from the time $t_1$ on, the output air-fuel ratio AFdwn of the downstream side air-fuel ratio sensor 41 gradually falls. As a result, at the time $t_2$, the output air-fuel ratio AFdwn of the downstream side air-fuel ratio sensor 41 reaches the rich judgment air-fuel ratio AFrich.

In the present embodiment, when the output air-fuel ratio AFdwn of the downstream side air-fuel ratio sensor 41 becomes the rich judgment air-fuel ratio or less, to make the stored amount of oxygen OSA increase, the air-fuel ratio correction amount AFC is switched to the lean set correction amount AFClean (corresponding to the lean set air-fuel ratio). Therefore, the target air-fuel ratio is switched from the rich air-fuel ratio to the lean air-fuel ratio. Further, at this time, the cumulative oxygen excess/deficiency ΣOED is reset to 0.

Note that, in the present embodiment, the air-fuel ratio correction amount AFC is switched after the output air-fuel ratio AFdwn of the downstream side air-fuel ratio sensor 41 reaches the rich judgment air-fuel ratio AFrich. This is because even if the stored amount of oxygen of the upstream side exhaust purification catalyst 20 is sufficient, the air-fuel ratio of the outflowing exhaust gas which sometimes ends up being slightly offset from the stoichiometric air-fuel ratio. Conversely speaking, the rich judgment air-fuel ratio is made an air-fuel ratio which the air-fuel ratio of the outflowing exhaust gas will never reach when the stored amount of oxygen of the upstream side exhaust purification catalyst 20 is sufficient.

At the time $t_2$, when the target air-fuel ratio is switched to the lean air-fuel ratio, the air-fuel ratio of the inflowing exhaust gas changes from the rich air-fuel ratio to the lean air-fuel ratio. Further, along with this, the output air-fuel ratio AFup of the upstream side air-fuel ratio sensor 40 becomes a lean air-fuel ratio (in actuality, a delay occurs from when the target air-fuel ratio is switched to when the air-fuel ratio of the inflowing exhaust gas changes, but in the illustrated example, it is deemed for convenience that the change is simultaneous). If at the time $t_2$ the air-fuel ratio of the inflowing exhaust gas changes to the lean air-fuel ratio, the upstream side exhaust purification catalyst 20 increases in the stored amount of oxygen OSA. Further, along with this, the cumulative oxygen excess/deficiency ΣOED also gradually increases.

Due to this, the air-fuel ratio of the outflowing exhaust gas changes to the stoichiometric air-fuel ratio, and the output air-fuel ratio AFdwn of the downstream side air-fuel ratio sensor 41 converges to the stoichiometric air-fuel ratio. At this time, the air-fuel ratio of the inflowing exhaust gas which becomes the lean air-fuel ratio, but there is sufficient leeway in the oxygen storage ability of the upstream side exhaust purification catalyst 20, so the oxygen in the inflowing exhaust gas is stored in the upstream side exhaust purification catalyst 20 and the $NO_X$ is removed by reduction. For this reason, the exhaust of $NO_X$ from the upstream side exhaust purification catalyst 20 becomes substantially zero.

After this, if the upstream side exhaust purification catalyst 20 increases in stored amount of oxygen OSA, at the time $t_3$, the stored amount of oxygen OSA of the upstream side exhaust purification catalyst 20 reaches the switching reference storage amount Cref. For this reason, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich. Therefore, the target air-fuel ratio is made the rich air-fuel ratio. Further, at this time, the cumulative oxygen excess/deficiency ΣOED is reset to 0.

Here, in the example which is shown in FIG. 6, at the time $t_3$, the target air-fuel ratio is switched and simultaneously the oxygen storage amount OSA falls, but in actuality, a delay occurs from when switching the target air-fuel ratio to when the oxygen storage amount OSA falls. Further, when acceleration of the vehicle mounting the internal combustion engine causes the engine load to become higher and the intake air amount to greatly deviate for an instant etc., the air-fuel ratio of the inflowing exhaust gas sometimes unintentionally greatly deviates from the target air-fuel ratio for an instant.

As opposed to this, the switching reference storage amount Cref is set sufficiently lower than the maximum storable oxygen amount Cmax when the upstream side exhaust purification catalyst 20 is new. For this reason, even if the above mentioned delay occurs or the air-fuel ratio of the actual exhaust gas unintentionally greatly deviates from the target air-fuel ratio for an instant, the stored amount of oxygen OSA does not reach the maximum storable oxygen amount Cmax. Conversely, the switching reference storage amount Cref is made an amount sufficiently small so that the stored amount of oxygen OSA does not reach the maximum storable oxygen amount Cmax even if the above mentioned delay or unintentionally deviation of air-fuel ratio occurs. For example, the switching reference storage amount Cref is made ¾ or less of the maximum storable oxygen amount Cmax when the upstream side exhaust purification catalyst 20 is new, preferably ½ or less, more preferably ⅕ or less.

At the time $t_3$, if the target air-fuel ratio is switched to the rich air-fuel ratio, the air-fuel ratio of the inflowing exhaust gas changes from the lean air-fuel ratio to the rich air-fuel ratio. Along with this, the output air-fuel ratio AFup of the upstream side air-fuel ratio sensor 40 becomes a rich air-fuel ratio (in actuality, a delay occurs from when the target air-fuel ratio is switched to when the inflowing exhaust gas changes in air-fuel ratio, but in the illustrated example, it is deemed for convenience that the change is simultaneous). The inflowing exhaust gas contains unburned gas, so the upstream side exhaust purification catalyst 20 gradually decreases in stored amount of oxygen OSA. At the time $t_4$, in the same way as the time $t_1$, the output air-fuel ratio AFdwn of the downstream side air-fuel ratio sensor 41 starts to fall. At this time as well, the air-fuel ratio of the inflowing exhaust gas is the rich air-fuel ratio, so substantially zero $NO_X$ is exhausted from the upstream side exhaust purification catalyst 20.

Next, at the time $t_5$, in the same way as time $t_2$, the output air-fuel ratio AFdwn of the downstream side air-fuel ratio sensor 41 reaches the rich judgment air-fuel ratio AFrich. Due to this, the air-fuel ratio correction amount AFC is switched to the value AFClean which corresponds to the lean set air-fuel ratio. After this, the cycle of the above mentioned times $t_1$ to $t_5$ is repeated.

Further, in the present embodiment, while the above-mentioned cycle of the times $t_1$ to $t_5$ is repeated, the amount of fuel which is fed to the combustion chamber 5 is controlled by feedback so that the output air-fuel ratio AFup of the upstream side air-fuel ratio sensor 40 becomes the target air-fuel ratio. For example, when the output air-fuel ratio AFup of the upstream side air-fuel ratio sensor 40 is lower (richer) than the target air-fuel ratio, the amount of fuel which is fed to the combustion chamber 5 is made smaller. On the other hand, when the output air-fuel ratio AFup of the upstream side air-fuel ratioسسs sensor 40 is higher (leaner) than the value corresponding to the target air-fuel ratio, the amount of fuel which is fed to the combustion chamber 5 becomes greater.

As will be understood from the above explanation, according to the present embodiment, it is possible to constantly suppress the amount of discharge of $NO_X$ from the upstream side exhaust purification catalyst 20. That is, so long as performing the above-mentioned control, basically, the amount of discharge of $NO_X$ from the upstream side exhaust purification catalyst 20 can be made substantially zero. Further, the cumulative time when calculating the cumulative oxygen excess/deficiency ΣOED is short, so there is less of a chance of calculation error compared with when calculating the cumulative amount over a long period of time. For this reason, error in calculation of the cumulative oxygen excess/deficiency ΣOED can be kept from causing $NO_X$ to end up being discharged.

Further, in general, if the stored amount of oxygen of the exhaust purification catalyst is maintained constant, the exhaust purification catalyst falls in oxygen storage ability. That is, to maintain the exhaust purification catalyst high in oxygen storage ability, the stored amount of oxygen of the exhaust purification catalyst has to fluctuate. As opposed to this, according to the present embodiment, as shown in FIG. 6, the stored amount of oxygen OSA of the upstream side exhaust purification catalyst 20 constantly fluctuates up and down, so the oxygen storage ability is kept from falling.

Note that, in the above embodiment, at the times $t_2$ to $t_3$, the air-fuel ratio correction amount AFC is maintained at the lean set correction amount AFClean. However, at this time period, the air-fuel ratio correction amount AFC does not necessarily have to be maintained constant. It may be set to gradually decrease or otherwise fluctuate. Alternatively, in the time period of the times $t_2$ to $t_3$, it is also possible to temporarily make the air-fuel ratio correction amount AFC a value smaller than 0 (for example, the rich set correction amount etc). That is, in the time period of the times $t_2$ to $t_3$, the target air-fuel ratio may also temporarily be made the rich air-fuel ratio.

Similarly, in the above embodiment, at the times $t_3$ to $t_5$, the air-fuel ratio correction amount AFC is maintained at the rich set correction amount AFCrich. However, at this time period, the air-fuel ratio correction amount AFC does not necessarily have to be maintained constant. It may be set to gradually increase or otherwise fluctuate. Alternatively, in the time period of the times $t_3$ to $t_5$, it is also possible to temporarily make the air-fuel ratio correction amount AFC a value larger than 0 (for example, the lean set correction amount etc.). That is, in the time period of the times $t_3$ to $t_5$, the target air-fuel ratio may also temporarily be made the lean air-fuel ratio.

However, in this case as well, the air-fuel ratio correction amount AFC at the times $t_2$ to $t_3$ is set so that the difference between the average value of the target air-fuel ratio and the stoichiometric air-fuel ratio at the times $t_2$ to $t_3$ becomes larger than the difference between the average value of the target air-fuel ratio and the stoichiometric air-fuel ratio at the times $t_3$ to $t_5$.

Further, in the above embodiment, the cumulative oxygen excess/deficiency ΣOED is calculated based on the output air-fuel ratio AFup etc. However, the stored amount of oxygen OSA may also be calculated based on other parameters in addition to these parameters and may be estimated based on parameters which are different from these parameters. Further, in the above embodiment, if the cumulative oxygen excess/deficiency ΣOED becomes the switching reference value OEDref or more, the target air-fuel ratio is switched from the lean set air-fuel ratio to the rich set air-fuel ratio. However, the timing of switching the target air-fuel ratio from the lean set air-fuel ratio to the rich set air-fuel ratio may, for example, also be based on the engine operating time or the cumulative amount of intake air from when switching the target air-fuel ratio from the rich set air-fuel ratio to the lean set air-fuel ratio or other parameter. However, in this case as well, the target air-fuel ratio has to be switched from the lean set air-fuel ratio to the rich set air-fuel ratio while the stored amount of oxygen OSA of the upstream side exhaust purification catalyst 20 is estimated to be smaller than the maximum storable oxygen amount.

<Scavenging>

In this regard, if valve overlap occurs when the pressure inside the intake port 7 (intake pressure) is higher than the pressure inside the exhaust port 9 (exhaust pressure), air will be blown from the intake passage through the cylinder to the exhaust passage as scavenging. Note that, "valve overlap" means the partial overlap of the opening time period of the intake valve 6 and the opening time period of the exhaust valve 8. The ECU 31 can control at least one of the variable valve timing mechanism B of the intake valve 6 and the variable valve timing mechanism C of the exhaust valve 8 so as to cause valve overlap and can change the valve overlap amount (that is, time period during which intake valve 6 and exhaust valve 8 are both opened). Specifically, the valve overlap amount is changed by at least one of changing the opening timing of the intake valve 6 and changing the closing timing of the exhaust valve 8.

Figure 7A:
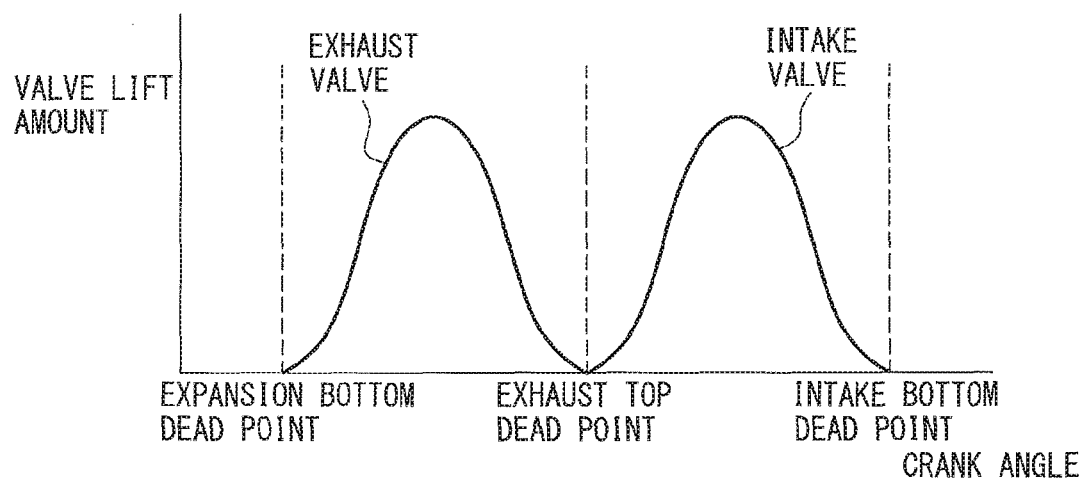
FIG. 7A and FIG. 7B are views schematically showing an example of opening time periods of an exhaust valve and intake valve.
Figure 7B:
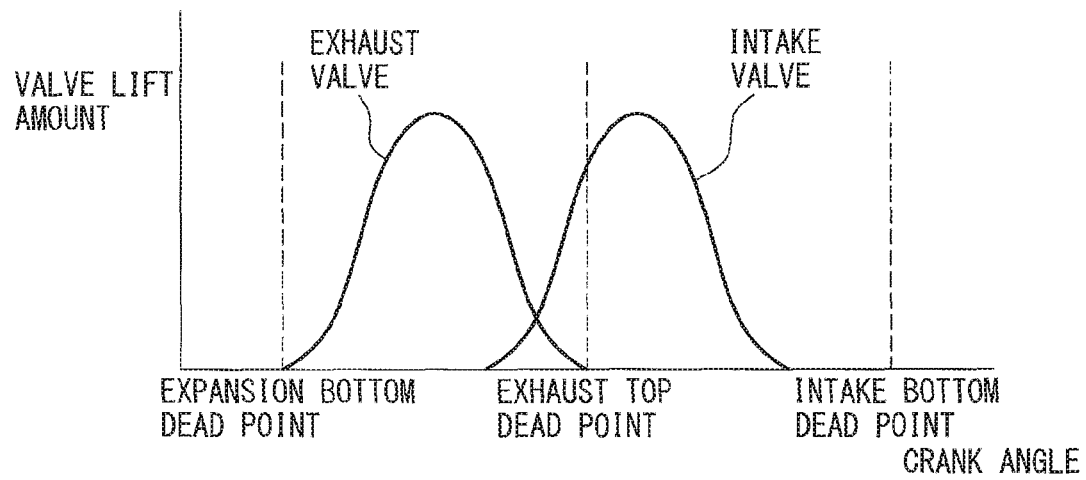

FIGS. 7A and 7B are views schematically showing examples of opening time periods of the exhaust valve 8 and intake valve 6. In the example shown in FIG. 7A, the closing timing of the exhaust valve 8 and the opening timing of the intake valve 6 match at exhaust top dead center so valve overlap does not occur. In the example shown in FIG. 7B, the opening time period of the exhaust valve 8 and the opening time period of the intake valve 6 overlap and valve overlap occurs.

If the amount of intake air is insufficient for the requested torque, scavenging is used. By causing scavenging, the amount of exhaust gas increases and the speed of the turbine 102 of the turbocharger 101 is raised. As a result, the pressure of the intake air (supercharging pressure) is raised and the amount of intake air is made to increase.

<Problem of Control of Air-Fuel Ratio During Scavenging>

As mentioned above, in the present embodiment, the amount of fuel fed to the combustion chamber 5 is feedback controlled so that the output air-fuel ratio AFup of the upstream side air-fuel ratio sensor 40 becomes the target air-fuel ratio. Further, the cumulative oxygen excess/deficiency $\Sigma OED$ is calculated based on the output air-fuel ratio AFup of the upstream side air-fuel ratio sensor 40, while the target air-fuel ratio is set based on the cumulative oxygen excess/deficiency $\Sigma OED$. Note that, during scavenging, the amount of fuel fed to the combustion chamber 5 is feedback controlled so that the average air-fuel ratio of the inflowing exhaust gas, including the air blown from the intake passage through the cylinder to the exhaust passage, becomes the target air-fuel ratio.

However, if scavenging occurs, the air in the cylinder decreases due to the blown air, so the combustion air-fuel ratio in the cylinder becomes rich. If the scavenging amount is large and the rich degree of the combustion air-fuel ratio becomes high, the concentration of hydrogen in the exhaust gas becomes higher. Hydrogen is faster in speed of diffusion in the diffusion-regulating layer of the air-fuel ratio sensor compared with other components in the exhaust gas, so reaches the electrode surface of the air-fuel ratio sensor faster than these other components. As a result, the electrode surface of the upstream side air-fuel ratio sensor 40 becomes a rich atmosphere and the output of the upstream air-fuel ratio sensor 40 deviates to the rich side. If controlling the air-fuel ratio based on an air-fuel ratio deviated to the rich side detected by the upstream side air-fuel ratio sensor 40, the actual exhaust air-fuel ratio becomes leaner than the target air-fuel ratio. As a result, the efficiency of removal of the unburned gas etc. at the exhaust purification catalysts 20 and 24 falls and the exhaust emission is liable to deteriorate. Below, this phenomenon will be explained with reference to FIG. 8.

Figure 8:
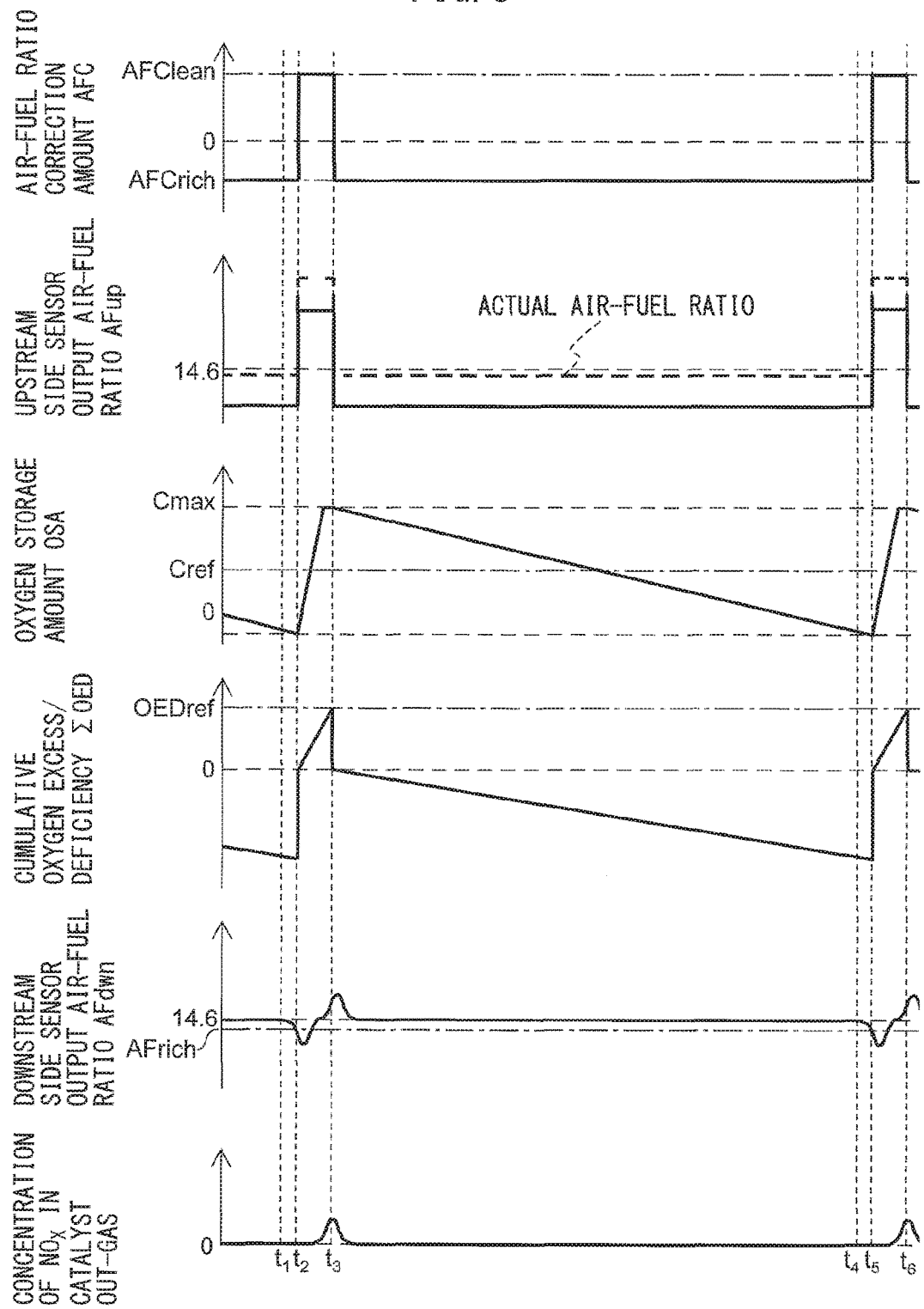
FIG. 8 is a time chart of an air-fuel ratio correction amount etc., during scavenging.

FIG. 8 is a time chart, similar to FIG. 6, of the oxygen storage amount OSA of the upstream side exhaust purification catalyst 20 etc. during scavenging. In the example of FIG. 8, due to the scavenging, the output of the upstream side air-fuel ratio sensor 40 deviates to the rich side. In the figure, the solid line at the output air-fuel ratio AFup of the upstream side air-fuel ratio sensor 40 shows the output air-fuel ratio. On the other hand, the broken line shows the actual air-fuel ratio of the inflowing exhaust gas.

In the example shown in FIG. 8 as well, in the state before the time $t_1$, the air-fuel ratio correction amount AFC is made the rich set correction amount AFCrich. Accordingly, the target air-fuel ratio is made the rich set air-fuel ratio. Along with this, the output air-fuel ratio AFup of the upstream side air-fuel ratio sensor 40 becomes an air-fuel ratio equal to the rich set air-fuel ratio. However, as explained above, the output air-fuel ratio of the upstream side air-fuel ratio sensor 40 deviates to the rich side, so the actual air-fuel ratio of the exhaust gas becomes an air-fuel ratio at the lean side of the rich set air-fuel ratio. That is, the output air-fuel ratio AFup of the upstream side air-fuel ratio sensor 40 becomes lower than the actual air-fuel ratio (broken line in figure) (to rich side). For this reason, the speed of decrease of the oxygen storage amount OSA of the upstream side exhaust purification catalyst 20 becomes slow.

Further, in the example shown in FIG. 8, at the time $t_2$, the output air-fuel ratio AFdwn of the downstream side air-fuel ratio sensor 41 reaches the rich judged air-fuel ratio AFrich. For this reason, as explained above, at the time $t_2$, the air-fuel ratio correction amount AFC is switched to the lean set correction amount AFClean. That is, the target air-fuel ratio is switched to the lean set air-fuel ratio.

Along with this, the output air-fuel ratio AFup of the upstream side air-fuel ratio sensor 40 becomes an air-fuel ratio equal to the lean set air-fuel ratio. However, as explained above, the output air-fuel ratio of the upstream side air-fuel ratio sensor 40 deviates to the rich side, so the actual air-fuel ratio of the exhaust gas becomes an air-fuel ratio leaner than the lean set air-fuel ratio. That is, the output air-fuel ratio AFup of the upstream side air-fuel ratio sensor 40 becomes lower than the actual air-fuel ratio (broken line in figure) (to rich side). For this reason, the speed of increase of the oxygen storage amount OSA of the upstream side exhaust purification catalyst 20 becomes fast.

In addition, if the deviation of the output air-fuel ratio of the upstream side air-fuel ratio sensor 40 is large, the speed of increase of the oxygen storage amount OSA of the upstream side exhaust purification catalyst 20 becomes extremely fast. Therefore, in this case, as shown in FIG. 8, before the cumulative oxygen excess/deficiency $\Sigma OED$ calculated based on the output air-fuel ratio AFup of the upstream side air-fuel ratio sensor 40 reaches the switching reference value OEDref, the actual oxygen storage amount OSA reaches the maximum storable oxygen amount Cmax. As a result, $NO_X$ and oxygen flow out from the upstream side exhaust purification catalyst 20 and the output air-fuel ratio of the downstream side air-fuel ratio sensor 41 becomes higher (leaner) than the stoichiometric air-fuel ratio.

<Control of Scavenging Amount>

In the present embodiment, the scavenging amount is controlled during scavenging to suppress deterioration of the exhaust emission accompanying scavenging. First, the control of the scavenging amount in the present embodiment will be explained in brief.

The internal combustion engine 100 further comprises a scavenging control device. The scavenging control device reduces the valve overlap amount so that the scavenging amount becomes smaller when the output air-fuel ratio of the downstream side air-fuel ratio sensor 41 changes from less than the lean judged air-fuel ratio (for example, 14.65) leaner than the stoichiometric air-fuel ratio to the lean judged air-fuel ratio or more during scavenging. The reason is believed to be that if the output air-fuel ratio of the downstream side air-fuel ratio sensor 41 becomes the lean judged air-fuel ratio or more during scavenging, $NO_X$ flows out from the upstream side exhaust purification catalyst 20 due to the large amount of scavenging. Note that, the valve overlap amount is made smaller by at least one of advancing the closing timing of the exhaust valve 8 by the variable valve timing mechanism C and of retarding the opening timing of the intake valve 6 by the variable valve timing mechanism B. For example, the valve overlap amount is made smaller by advancing the phase angle of the exhaust valve 8 by the variable valve timing mechanism C and by retarding the phase angle of the intake valve 6 by the variable valve timing mechanism B. Note that, in this Description, the "phase angle" means the central angle of the operating angle.

If reducing the scavenging amount, the rich degree of the combustion air-fuel ratio becomes lower and the concentration of hydrogen in the exhaust gas becomes lower. As a result, the amount of deviation of the output of the upstream side air-fuel ratio sensor 40 to the rich side is made smaller and the actual exhaust air-fuel ratio approaches the target air-fuel ratio. Therefore, deterioration of the efficiency of removal of unburned gas etc. at the upstream side exhaust purification catalyst 20 is suppressed and in turn deterioration of the exhaust emission is suppressed.

In this regard, the upstream side exhaust purification catalyst 20 deteriorates along with the elapse of time. Along with the deterioration of the upstream side exhaust purification catalyst 20, the maximum storable oxygen amount Cmax of the upstream side exhaust purification catalyst 20 becomes gradually smaller. In this case, the allowed scavenging amount also becomes smaller. Therefore, to reliably prevent the outflow of $NO_X$ from the upstream side exhaust purification catalyst 20, if setting the upper limit of the scavenging amount considering the maximum storable oxygen amount Cmax of the deteriorated upstream side exhaust purification catalyst 20, the upper limit becomes an extremely small amount. As a result, even during the time period before the exhaust purification catalyst deteriorates, it is not possible to cause a sufficient amount of scavenging corresponding to the requested torque.

However, in the present embodiment, the downstream side air-fuel ratio sensor 41 can be used to precisely detect the outflow of oxygen from the upstream side exhaust purification catalyst 20 and in turn to quickly estimate the outflow of $NO_X$ from the upstream side exhaust purification catalyst 20. The reason is that, the large amount of hydrogen generated in the exhaust gas during scavenging is removed by oxidation at the upstream side exhaust purification catalyst 20, so the downstream side air-fuel ratio sensor 41 is not affected much at all by the hydrogen. Therefore, in the present embodiment, it is possible to cause a suitable amount of scavenging corresponding to the state of deterioration of the upstream side exhaust purification catalyst 20.

Further, the scavenging control device controls the valve overlap amount so that the scavenging amount becomes the upper limit or less, decreases the upper limit when an air-fuel ratio of the lean judged air-fuel ratio or more is detected by the downstream side air-fuel ratio sensor 41 during scavenging, and maintains or increases the upper limit when an air-fuel ratio of the lean judged air-fuel ratio or more is not detected by the downstream side air-fuel ratio sensor 41 during scavenging. The initial value of the upper limit is made a value where $NO_X$ will not flow out from the upstream side exhaust purification catalyst 20 due to scavenging when the upstream side exhaust purification catalyst 20 is unused. Note that, the valve overlap amount, as explained above, can be controlled by the ECU 31 by controlling at least one of the variable valve timing mechanisms B and C.

By reducing the upper limit when an air-fuel ratio of the lean judged air-fuel ratio or more is detected by the downstream side air-fuel ratio sensor 41 during scavenging, in the later air-fuel ratio control, the outflow of $NO_X$ from the upstream side exhaust purification catalyst 20 can be suppressed. Further, it is possible to set the upper limit corresponding to the state of deterioration of the upstream side exhaust purification catalyst 20.

Further, the upper limit of the scavenging amount is liable to be set excessively low due to some sort of control error. In this case, in the later operation of the internal combustion engine, it is not possible to cause a sufficient amount of scavenging corresponding to the requested torque. Therefore, the scavenging control device increases the upper limit when an air-fuel ratio of the lean judged air-fuel ratio or more has not been detected by the downstream side air-fuel ratio sensor 41 regardless of controlling the valve overlap amount so that the scavenging amount becomes the upper limit. Due to this, even if the upper limit was set excessively low, the upper limit can be corrected to a suitable value. Note that, the scavenging control device maintains the upper limit even if an air-fuel ratio of the lean judged air-fuel ratio or more has not been detected by the downstream side air-fuel ratio sensor 41 when controlling the valve overlap amount so that the scavenging amount becomes less than the upper limit.

<Explanation of Control of Scavenging Amount Using Time Chart>

Figure 9:
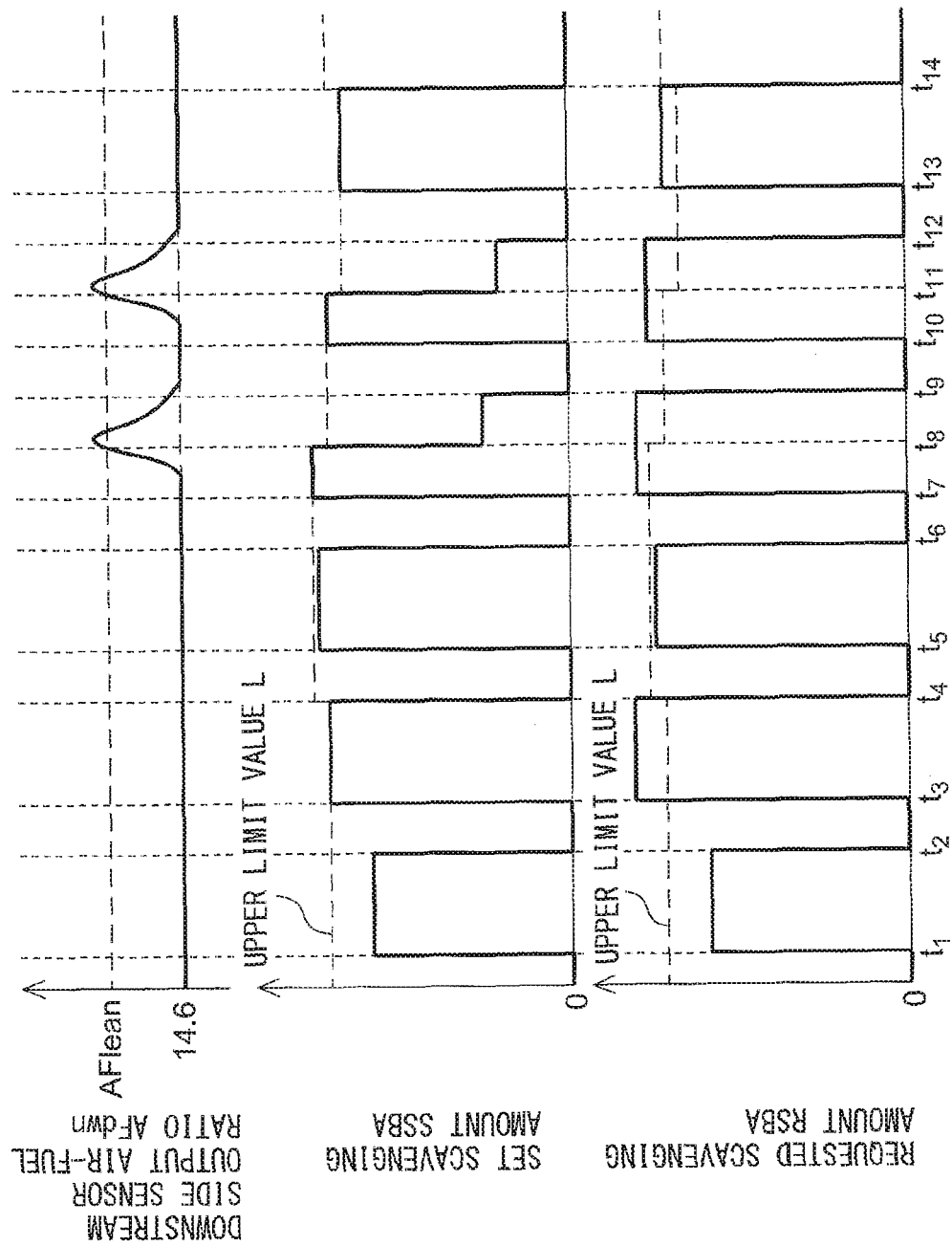
FIG. 9 is a time chart of a requested scavenging amount etc. in the case of performing control of the scavenging amount in the present embodiment.

Referring to FIG. 9, the above-mentioned such control will be specifically explained. FIG. 9 is a time chart of the requested scavenging amount RSBA, the set scavenging amount SSBA, and the output air-fuel ratio AFdwn of the downstream side air-fuel ratio sensor 41 in the case of control of the scavenging amount in the present embodiment. In the figure, the broken lines in the time chart of the requested scavenging amount RSBA and the set scavenging amount SSBA show the upper limit L of the scavenging amount. The requested scavenging amount RSBA is calculated based on the requested torque, while the set scavenging amount SSBA is set based on the requested scavenging amount RSBA and upper limit L. During scavenging, the valve overlap amount is controlled so that the scavenging amount becomes the set scavenging amount SSBA. In the example shown in FIG. 9, scavenging is caused at the time $t_1$ to the time $t_2$, the time $t_3$ to the time $t_4$, the time $t_5$ to the time $t_6$, the time $t_7$ to the time $t_9$, the time $t_{10}$ to the time $t_{12}$, and the time $t_{13}$ to the time $t_{14}$. Note that, in the time chart of the requested scavenging amount RSBA and the set scavenging amount SSBA of FIG. 9, parts shown by only solid lines have solid lines and broken lines overlapped.

At the time $t_1$, the requested scavenging amount RSBA is smaller than the upper limit L. For this reason, at the time $t_1$, the set scavenging amount SSBA is set to the requested scavenging amount RSBA. Further, in the scavenging time of the times $t_1$ to $t_2$, the lean judged air-fuel ratio AFlean (for example, 14.65) was not detected by the downstream side air-fuel ratio sensor 41, but the set scavenging amount SSBA was smaller than the upper limit L, so the upper limit L is maintained.

At the time $t_3$, the requested scavenging amount RSBA is larger than the upper limit L. For this reason, at the time $t_3$, the set scavenging amount SSBA is set to the upper limit L. Further, at the scavenging time of the times $t_3$ to $t_4$, regardless of having controlled the valve overlap amount so that the scavenging amount becomes the upper limit L, the lean judged air-fuel ratio AFlean has not been detected by the downstream side air-fuel ratio sensor 41, so at the time $t_4$ after the end of scavenging, the upper limit L is increased.

At the time $t_5$, the requested scavenging amount RSBA is smaller than the increased upper limit L. For this reason, at the time $t_5$, the set scavenging amount SSBA is set to the requested scavenging amount RSBA. Further, in the scavenging time of the times $t_5$ to $t_6$, the lean judged air-fuel ratio AFlean was not detected by the downstream side air-fuel ratio sensor 41 during scavenging, but the set scavenging amount SSBA was smaller than the upper limit L, so the upper limit L is maintained.

At the time $t_7$, the requested scavenging amount RSBA is larger than the upper limit L. For this reason, at the time $t_7$, the set scavenging amount SSBA is set to the upper limit L. In the example shown in FIG. 9, at the time $t_8$ during scavenging, the downstream side sensor output air-fuel ratio AFdwn changes to the lean judged air-fuel ratio AFlean or more. For this reason, at the time $t_8$, the valve overlap is controlled so as to greatly decrease the set scavenging amount SSBA along with which the scavenging amount becomes smaller. Further, at the time $t_8$, the upper limit L is decreased. Note that, as long as the upper limit L is decreased before the next scavenging, the upper limit L may be decreased after the end of the scavenging, that is, from the time $t_9$ on.

Note that, in the present embodiment, after the output air-fuel ratio AFdwn of the downstream side air-fuel ratio sensor 41 changes to the lean judged air-fuel ratio AFlean or more, the set scavenging amount SSBA is decreased. This is because sometimes even if $NO_X$ does not flow out from the upstream side exhaust purification catalyst 20, the air-fuel ratio of the outflowing exhaust gas ends up deviating very slightly from the stoichiometric air-fuel ratio. Conversely speaking, the lean judged air-fuel ratio AFlean is made the air-fuel ratio which the air-fuel ratio of the outflowing exhaust gas will not reach when $NO_X$ does not flow out from the upstream side exhaust purification catalyst 20.

At the time $t_{10}$, the requested scavenging amount RSBA is larger than the decreased upper limit L. For this reason, at the time $t_{10}$, the set scavenging amount SSBA is set to the upper limit L. In the example shown in FIG. 9, at the time $t_{11}$ during scavenging, the downstream side sensor output air-fuel ratio AFdwn changes to the lean judged air-fuel ratio AFlean or more. For this reason, at decrease the set scavenging amount SSBA along with which the scavenging amount becomes smaller. Further, at the time $t_{11}$, the upper limit L is decreased.

At the time $t_{13}$, the requested scavenging amount RSBA is larger than the upper limit L. For this reason, at the time $t_{13}$, the set scavenging amount SSBA is set to the upper limit L. Further, in the scavenging time of the times $t_{13}$ to $t_{14}$, regardless of controlling the valve overlap amount so that the scavenging amount becomes the upper limit L, the lean judged air-fuel ratio AFlean has not been detected by the downstream side air-fuel ratio sensor 41, so the upper limit L is increased at the time $t_{14}$ after the end of scavenging. After that as well, control similar to the time $t_1$ to the time $t_{14}$ is performed.

Further, in the present embodiment, even during scavenging, the above-mentioned basic air-fuel ratio control is performed. During scavenging, the amount of fuel fed to the combustion chamber is controlled so that the average air-fuel ratio of the inflowing exhaust gas including the scavenging amount becomes the target air-fuel ratio. In this case, when the target air-fuel ratio is switched from the rich set air-fuel ratio to the lean set air-fuel ratio, the rich air-fuel ratio is detected by the downstream side air-fuel ratio sensor 41. However, in FIG. 9, to facilitate understanding, note that in the time chart of the downstream side output air-fuel ratio AFdwn, an air-fuel ratio richer than the stoichiometric air-fuel ratio is not shown.

<Control Routine of Control of Scavenging Amount>

Figure 10:
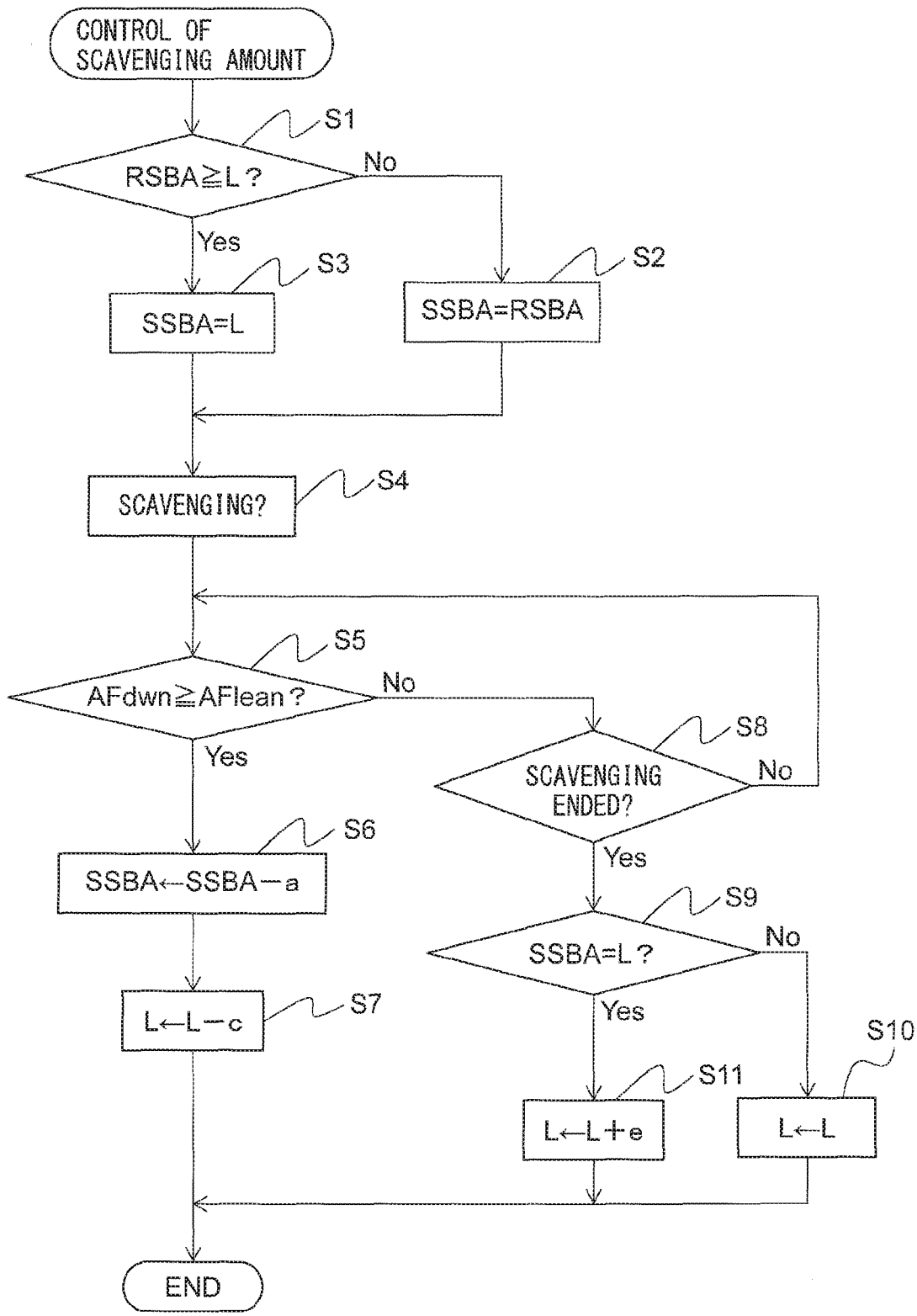
FIG. 10 is a flow chart showing a control routine of control of the scavenging amount in an embodiment of the present invention.

Next, referring to the flow chart of FIG. 10, control of the scavenging amount will be explained in detail. FIG. 10 is a flow chart showing a control routine of control of the scavenging amount in an embodiment of the present invention. The illustrated control routine is executed when causing scavenging.

First, at step S1, it is judged if the requested scavenging amount RSBA is the upper limit L of the scavenging amount or more. The initial value of the upper limit L is made a value so that $NO_X$ does not flow out from the upstream side exhaust purification catalyst 20 due to scavenging when the upstream side exhaust purification catalyst 20 is not yet used.

The requested scavenging amount RSBA is, for example, calculated based on a map shown as a function of the engine speed and requested torque. Specifically, in the above map, the requested scavenging amount RSBA is shown as becoming larger the lower the engine speed and is shown as becoming larger the higher the requested torque. Note that, the engine speed is calculated based on the output of the crank angle sensor 44. Further, the requested torque is calculated based on the output of the load sensor 43 connected to the accelerator pedal 42.

When, at step S1, it is judged that the requested scavenging amount RSBA is smaller than the upper limit L, the routine proceeds to step S2. At step S2, the set scavenging amount SSBA is set to the requested scavenging amount RSBA. After step S2, the routine proceeds to step S4. On the other hand, when, at step S1, it is judged that the requested scavenging amount RSBA is the upper limit L or more, the routine proceeds to step S3. At step S3, the set scavenging amount SSBA is set to the upper limit L. After step S3, the routine proceeds to step S4.

At step S4, scavenging is caused and the valve overlap amount is controlled so that the scavenging amount becomes the set scavenging amount SSBA set at step S2 or step S3.

Next, at step S5, it is judged if the output air-fuel ratio AFdwn of the downstream side air-fuel ratio sensor 41 is the lean judged air-fuel ratio AFlean or more. The output air-fuel ratio AFdwn of the downstream side air-fuel ratio sensor 41 is acquired from the downstream side air-fuel ratio sensor 41. Further, the lean judged air-fuel ratio AFlean is a predetermined air-fuel ratio slightly leaner than the stoichiometric air-fuel ratio (for example, 14.65).

When, at step S5, it is judged that the output air-fuel ratio AFdwn of the downstream side air-fuel ratio sensor 41 is the lean judged air-fuel ratio AFlean or more, that is, if, during scavenging, the output air-fuel ratio AFdwn of the downstream side air-fuel ratio sensor 41 changes to the lean judged air-fuel ratio AFlean or more, the routine proceeds to step S6.

At step S6, the set scavenging amount SSBA is greatly decreased so as to suppress the outflow of $NO_X$ from the upstream side exhaust purification catalyst 20. Therefore, the valve overlap amount is made smaller so that the scavenging amount becomes smaller based on the decreased set scavenging amount SSBA. For example, at step S6, the set scavenging amount SSBA set at step S2 or step S3 minus a predetermined value "a" is made the new set scavenging amount SSBA. The predetermined value "a" is a predetermined positive number. Further, at step S6, the set scavenging amount SSBA set at step S2 or step S3 multiplied with a coefficient "b" may be made the new set scavenging amount SSBA. The coefficient "b" is a predetermined positive number less than 1. The decreased set scavenging amount SSBA is made ¾ or less of the upper limit L, preferably ½ or less, more preferably ⅕ or less, to quickly suppress the outflow of $NO_X$.

Next, at step S7, the upper limit L is decreased so as to suppress the outflow of $NO_X$ from the upstream side exhaust purification catalyst 20 at the next scavenging and on. For example, at step S7, the current upper limit L minus a predetermined value "c" is made the new upper limit L. The predetermined value "c" is a predetermined positive number. Further, at step S7, the current upper limit L multiplied with the coefficient "d" may be made the new upper limit L. The coefficient "d" is a predetermined positive number less than 1 (for example 0.9). After the upper limit L is updated at step S7, the present control routine is ended.

On the other hand, when, at step S5, it is judged that the output air-fuel ratio AFdwn of the downstream side air-fuel ratio sensor 41 is smaller than the lean judged air-fuel ratio AFlean, the routine proceeds to step S8. At step S8, it is judged if the scavenging has ended.

When at step S8 it is judged that the scavenging has not ended, the routine returns to step S5 and step S5 is repeated. Note that, in actuality, a delay occurs from scavenging to when the blown air reaches the upstream side air-fuel ratio sensor 40 and upstream side exhaust purification catalyst 20. For this reason, step S5 may be repeated until the ending time of scavenging plus a delay time.

On the other hand, if at step S8 it is judged that the scavenging has ended, that is, if the lean judged air-fuel ratio AFlean has not been detected by the downstream side air-fuel ratio sensor 41 due to scavenging, the routine proceeds to step S9. At step S9, it is judged if the set scavenging amount SSBA during scavenging was the upper limit L. When it is judged that the set scavenging amount SSBA during scavenging was not the upper limit L, the routine proceeds to step S10. At step S10, the upper limit L is maintained at the current value. After step S10, the present control routine is ended.

On the other hand, if, at step S9, it is judged that the set scavenging amount SSBA during scavenging was the upper limit L, the routine proceeds to step S11.

At step S11, regardless of controlling the valve overlap amount so that the scavenging amount becomes the upper limit L, the lean judged air-fuel ratio AFlean has not been detected by the downstream side air-fuel ratio sensor 41, so the upper limit L is increased. For example, at step S11, the current upper limit L plus a predetermined value "e" is made the new upper limit L. The predetermined value "e" is a predetermined positive number. Further, at step S11, the current upper limit L multiplied by a coefficient "f" may be made the new upper limit L. The coefficient "f" is a predetermined positive number larger 1 (for example 1.1). Note that, the upper limit L may be maintained when the target air-fuel ratio during scavenging has been set to only the rich set air-fuel ratio, while the upper limit L may be increased only when the target air-fuel ratio during scavenging has been set to the lean set air-fuel ratio. That is, the scavenging control device may increase the upper limit when the lean judged air-fuel ratio AFlean has not been detected by the downstream side air-fuel ratio sensor 41 regardless of controlling the valve overlap amount so that the scavenging amount becomes the upper limit L while the target air-fuel ratio is set to the lean set air-fuel ratio. After the upper limit L is updated at step S11, the present control routine is ended.

Note that, all of the above-mentioned control routines are controlled by the ECU 31 of the internal combustion engine 100.

Above, preferred embodiments according to the present invention were explained, but the present invention is not limited to these embodiments and can be modified and changed in various ways within the scope of the claims.

For example, it is also possible to not use the upstream side air-fuel ratio sensor 40, but control the air-fuel ratio based on only the output of the downstream side air-fuel ratio sensor 41. In this case, instead of feedback control of the amount of fuel fed to the combustion chamber 5 based on the output of the upstream side air-fuel ratio sensor 40, the amount of fuel fed to the combustion chamber 5 is controlled so that the ratio of the fuel and air fed to the combustion chamber 5 matches the target air-fuel ratio. Specifically, the amount of fuel calculated from the amount of intake air and the target air-fuel ratio is fed to the combustion chamber 5. Note that, when the upstream side air-fuel ratio sensor 40 is not used, the oxygen excess/deficiency OED used for setting the target air-fuel ratio is, for example, calculated by the following formula (2).

$$OED = 0.23 \times (TAF - AFR) \times Qi \tag{2}$$

Here, 0.23 indicates the concentration of oxygen in the air, Qi indicates the fuel injection amount, TAF indicates the target air-fuel ratio, and AFR indicates the air-fuel ratio forming the control center (in the present embodiment, stoichiometric air-fuel ratio (14.6)).

During scavenging, the amount of fuel fed to the combustion chamber 5 is controlled so that the average air-fuel ratio of the inflowing exhaust gas, including the scavenging amount, becomes the target air-fuel ratio. However, even if such control has been performed, during scavenging, the air blown through the exhaust passage and unburned fuel alternately reach the exhaust purification catalyst whereby the exhaust purification catalyst cannot effectively purify the exhaust gas and the exhaust emission is liable to deteriorate. However, in this case as well, by performing control of the scavenging amount in the present embodiment, it is possible to suppress deterioration of exhaust emission accompanying scavenging without excessively limiting the scavenging amount.

Further, in the above-mentioned control of the air-fuel ratio, the target air-fuel ratio is alternately set to the rich set air-fuel ratio and the lean set air-fuel ratio, but, for example, it may also be maintained at the stoichiometric air-fuel ratio.

REFERENCE SIGNS LIST 1. engine body
5. combustion chamber
6. intake valve
8. exhaust valve
18. throttle valve
20. upstream side exhaust purification catalyst
24. downstream side exhaust purification catalyst
31. ECU
40. upstream side air-fuel ratio sensor
41. downstream side air-fuel ratio sensor
100. internal combustion engine
101. turbocharger (supercharger)
B, C. variable valve timing mechanism

The invention claimed is:

1. An internal combustion engine comprising:
a supercharger able to change a pressure of air fed to a combustion chamber,
a variable valve timing mechanism able to change a valve overlap amount of an intake valve and an exhaust valve,
a catalyst arranged in an exhaust passage and able to store oxygen,
a downstream side air-fuel ratio sensor arranged at a downstream side of the catalyst in an exhaust flow direction and able to detect an air-fuel ratio of outflowing exhaust gas flowing out from the catalyst, and
a scavenging control device able to control a scavenging amount by controlling the valve overlap amount by the variable valve timing mechanism, wherein the scavenging control device reduces the valve overlap amount when an air-fuel ratio detected by the downstream side air-fuel ratio sensor changes from less than a lean judged air-fuel ratio leaner than a stoichiometric air-fuel ratio to the lean judged air-fuel ratio or more during scavenging.

2. The internal combustion engine according to claim 1, further comprising
an upstream side air-fuel ratio sensor arranged at an upstream side of the catalyst in the exhaust flow direction and able to detect an air-fuel ratio of inflowing exhaust gas flowing into the catalyst, and
an air-fuel ratio control device controlling an amount of fuel fed to the combustion chamber by feedback control so that an air-fuel ratio detected by the upstream side air-fuel ratio sensor matches a target air-fuel ratio.

3. The internal combustion engine according to claim 2, wherein
the target air-fuel ratio is alternately set to a rich set air-fuel ratio richer than the stoichiometric air-fuel ratio and a lean set air-fuel ratio leaner than the stoichiometric air-fuel ratio, and
the air-fuel ratio control device switches the target air-fuel ratio to the lean set air-fuel ratio when an air-fuel ratio detected by the downstream side air-fuel ratio sensor becomes a rich judged air-fuel ratio richer than the stoichiometric air-fuel ratio or becomes less in rich control where the target air-fuel ratio is set to the rich set air-fuel ratio, and switches the target air-fuel ratio to the rich set air-fuel ratio when it is estimated that the oxygen storage amount of the catalyst becomes a switching reference storage amount smaller than a maximum storable oxygen amount or becomes more in lean control where the target air-fuel ratio is set to the lean set air-fuel ratio.

4. The internal combustion engine according to claim 1, wherein the scavenging control device controls the valve overlap amount so that the scavenging amount becomes an upper limit or less, decreases the upper limit when an air-fuel ratio of the lean judged air-fuel ratio or more is detected by the downstream side air-fuel ratio sensor during scavenging, and maintains or increases the upper limit when an air-fuel ratio of the lean judged air-fuel ratio or more has not been detected by the downstream side air-fuel ratio sensor during scavenging.

5. The internal combustion engine according to claim 2, wherein the scavenging control device controls the valve overlap amount so that the scavenging amount becomes an upper limit or less, decreases the upper limit when an air-fuel ratio of the lean judged air-fuel ratio or more is detected by the downstream side air-fuel ratio sensor during scavenging, and maintains or increases the upper limit when an air-fuel ratio of the lean judged air-fuel ratio or more has not been detected by the downstream side air-fuel ratio sensor during scavenging.

6. The internal combustion engine according to claim 3, wherein the scavenging control device controls the valve overlap amount so that the scavenging amount becomes an upper limit or less, decreases the upper limit when an air-fuel ratio of the lean judged air-fuel ratio or more is detected by the downstream side air-fuel ratio sensor during scavenging, and maintains or increases the upper limit when an air-fuel ratio of the lean judged air-fuel ratio or more has not been detected by the downstream side air-fuel ratio sensor during scavenging.

7. The internal combustion engine according to claim 4, wherein the scavenging control device increases the upper limit when an air-fuel ratio of the lean judged air-fuel ratio or more has not been detected by the downstream side air-fuel ratio sensor regardless of having controlled the valve overlap amount so that the scavenging amount becomes the upper limit.

8. The internal combustion engine according to claim 5, wherein the scavenging control device increases the upper limit when an air-fuel ratio of the lean judged air-fuel ratio or more has not been detected by the downstream side air-fuel ratio sensor regardless of having controlled the valve overlap amount so that the scavenging amount becomes the upper limit.

9. The internal combustion engine according to claim 6, wherein the scavenging control device increases the upper limit when an air-fuel ratio of the lean judged air-fuel ratio or more has not been detected by the downstream side air-fuel ratio sensor regardless of having controlled the valve overlap amount so that the scavenging amount becomes the upper limit.

* * * * *

UNITED STATES PATENT AND TRADEMARK OFFICE
CERTIFICATE OF CORRECTION

PATENT NO. : 9,856,811 B2  
APPLICATION NO. : 15/166618  
DATED : January 2, 2018  
INVENTOR(S) : Takuya Okubo et al.

Page 1 of 1

It is certified that error appears in the above-identified patent and that said Letters Patent is hereby corrected as shown below:

In the Specification

At Column 19, Line 46 change the content from:
"For this reason, at decrease"
To:
"For this reason, at the time $t_{11}$, the valve overlap is controlled to greatly decrease"

Signed and Sealed this
Twenty-ninth Day of May, 2018

Andrei Iancu
*Director of the United States Patent and Trademark Office*